US012801767B2

(12) United States Patent
Gupta et al.

(10) Patent No.: US 12,801,767 B2
(45) Date of Patent: Nov. 17, 2026

(54) THIRD PARTY RESOLUTION OF TEMPLATE PARAMETERS DURING AUTOMATED DOCUMENT GENERATION PROCESSING

(71) Applicant: Box, Inc., Redwood City, CA (US)

(72) Inventors: Virender Gupta, Morganville, NJ (US); Iyer Nirmal Ganesh, San Jose, CA (US); Nachiket Deo, San Jose, CA (US); Stephen Philip Hiller, Santa Clara, CA (US)

(73) Assignee: Box, Inc., Redwood City, CA (US)

( * ) Notice: Subject to any disclaimer, the term of this patent is extended or adjusted under 35 U.S.C. 154(b) by 444 days.

(21) Appl. No.: 18/087,645

(22) Filed: Dec. 22, 2022

(65) Prior Publication Data

US 2024/0211617 A1 Jun. 27, 2024

(51) Int. Cl.
*G06F 21/62* (2013.01)
*G06F 40/10* (2020.01)
*G06F 40/186* (2020.01)

(52) U.S. Cl.
CPC .......... *G06F 21/6218* (2013.01); *G06F 40/10* (2020.01); *G06F 40/186* (2020.01)

(58) Field of Classification Search
CPC ..... G06F 21/6218; G06F 40/10; G06F 40/186
See application file for complete search history.

(56) References Cited

U.S. PATENT DOCUMENTS 12,014,309 B1 * 6/2024 Li ........................ G06Q 10/067
2023/0055241 A1 * 2/2023 Zionpour .............. G06F 40/186
2024/0111817 A1 * 4/2024 Hunn ...................... G06F 16/93

OTHER PUBLICATIONS

Conga, Conga Revenue Lifecycle Cloud, Product Documentation, date retrieved by Google, Nov. 2020.
Create Document Templates with DocuSign Tags—Help—Agiloft Help, https://wiki.agiloft.com/display/HELP/Create+Document+Templates+with+DocuSign+Tags, Dated 2021.
JSONata, JSON query and transformation language, https://jsonata.org/, date retrieved by Google, Dec. 2018.

(Continued)

*Primary Examiner* — Nelson S. Giddins
(74) *Attorney, Agent, or Firm* — Vista IP Law Group, LLP

(57) ABSTRACT

Methods, systems, and computer program products for automated document generation within a collaboration system. Multiple components are operatively interconnected to carry out automated document generation operations. Collaboration activity limitations are enforced over newly-generated documents. The document generation process produces newly-generated documents and other outputs that are stored in the collaboration system. Operational elements of the collaboration system are able to access the generated document and other document generation system outputs to perform content analysis. Based at least in part on results of the content analysis, characteristics of the generated document and characteristics of the corresponding document system I/O, the collaboration system assigns and/or modifies access parameters of the newly-generated document and its metadata. The access parameters control ongoing enforcement of document handling policies. The document generation process gathers information from third-party systems to produce situation- or application-specific generated documents.

20 Claims, 20 Drawing Sheets

(56) References Cited

OTHER PUBLICATIONS

"Adobe Document Generation Tagger Brief Overview" Adobe Developers, YouTube Video, URL: https://www.youtube.com/watch?v=LgLfvJtdB38, video uploaded on May 6, 2021.
"Introducing Adobe Document Generation API (Paper Clips)", Adobe Developers, YouTube Video, URL: https://www.youtube.com/watch?v=uptAtNpsnjM, video uploaded on Apr. 21, 2021.
"Generate document with new Document Builder in Adobe Acrobat Sign in Salesforce—Paper Clips", Adobe Developers, YouTube Video, URL: https://www.youtube.com/watch?v=8j2829cvY-8, video uploaded on Jul. 28, 2022.
Oracle, SimpleDateFormat (Java Platform SE 8 ) https://docs.oracle.com/javase/8/docs/api/java/text/SimpleDateFormat.html, date retrieved by Google, Jan. 1997.
"Adobe Document Generation API: Placing Images", Adobe Developers, YouTube Video, URL:https://www.youtube.com/watch?v=39QJPIIjND8, video uploaded on Apr. 21, 2021.
"Formstack Documents (formerly WebMerge) Overview | Formstack", Formstack, YouTube Video, URL: https://www.youtube.com/watch?v=Y_0U2d4zXAw, video uploaded on Feb. 22, 2021.
Adobe Developer, "What is Document Generation?", Document Generation API, Adobe PDF Services, https://developer.adobe.com/document-services/docs/overview/document-generation-api/, date retrieved by Google, May 2022.
Formstack, AI-Powered Document Generation, Document Generation & Automation software, https://www.formstack.com/products/documents, date retrieved by Google, Sep. 2020.
Adobe Developer, Word Add-in, Document Generation API, Adobe PDF Service, ,https://developer.adobe.com/document-services/docs/overview/document-generation-api/wordaddin/, date retrieved by Google, Mar. 2021.
Adobe Document Generation API Demo, https://documentservices.adobe.com/dc/docgen-playground/index.html#/, date retrieved by Google, Sep. 2024.
Adobe, Document Generation API Tutorials, Adobe Acrobat Services, https://experienceleague.adobe.com/en/docs/acrobat-services-learn/tutorials/docgen/overview-docgen, dated Apr. 2024.
Apryse, Document Generation & Automation, https://apryse.com/capabilities/document-generation, date retrieved by Google Apr. 2024.
Nintex-Marc, "AssureSign and Nintex Workflow Cloud Document Generation", YouTube Video, URL: https://www.youtube.com/watch?v=GCyLhQBBdi8, video uploaded on Jan. 2, 2022.
JSONata, "JSONata Documentation", https://docs.jsonata.org/overview.html, date retrieved by Google, May 2018.

* cited by examiner

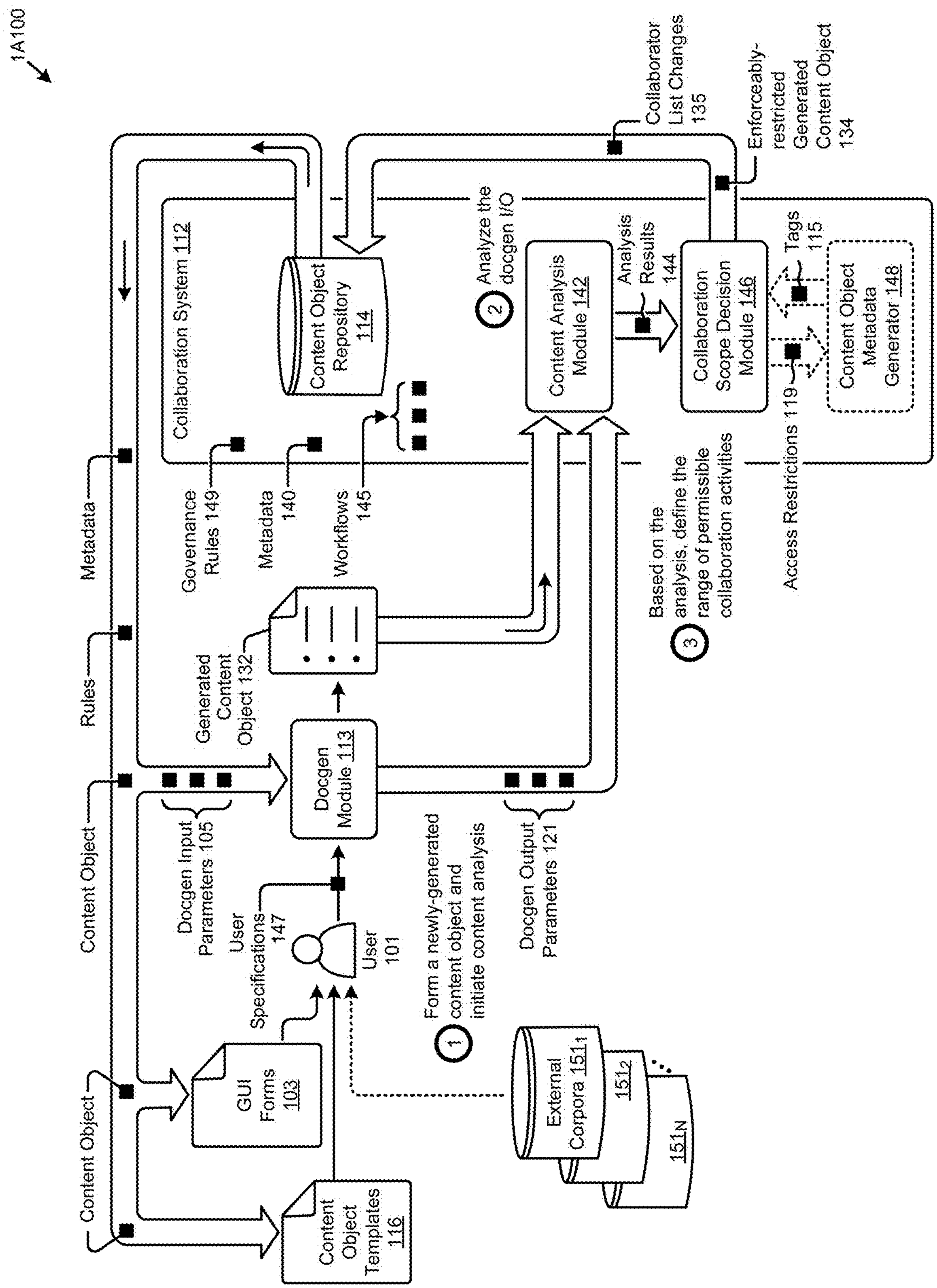
FIG. 1A1

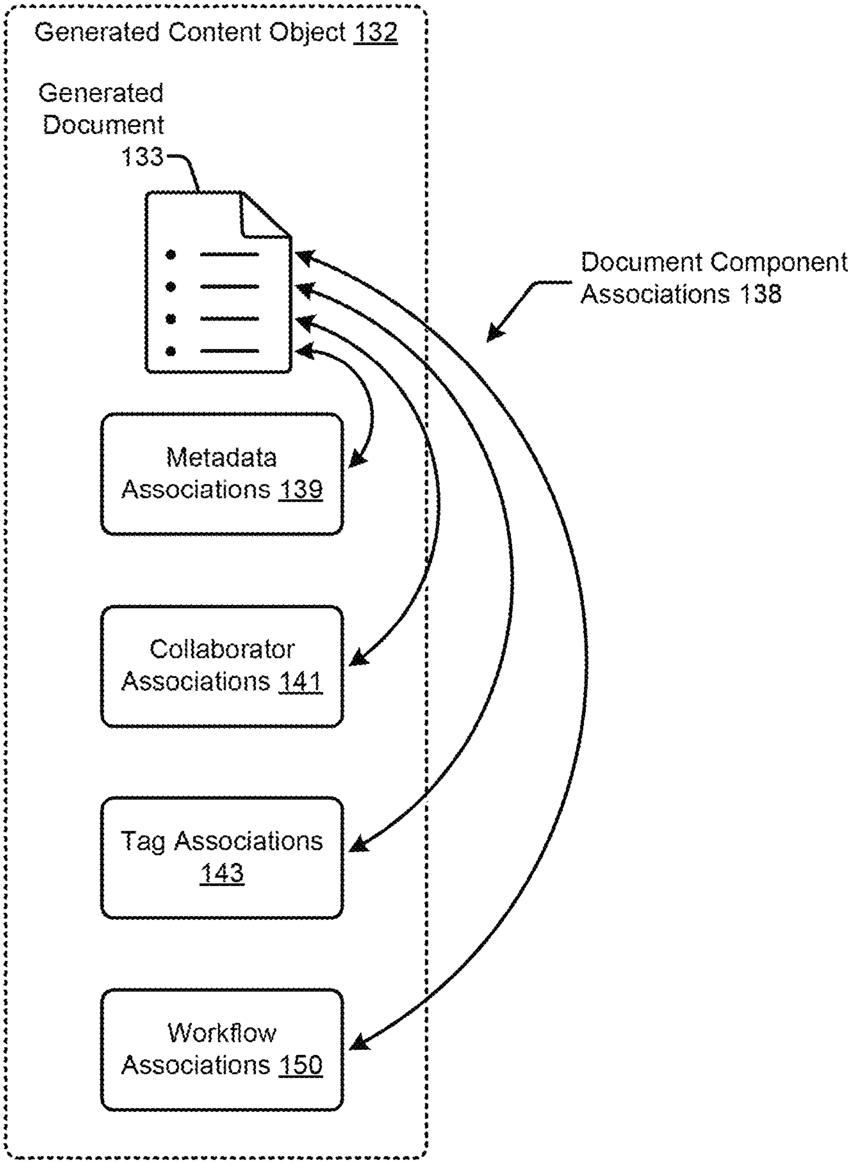
FIG. 1A2

1B00

6A00

6B00

THIRD PARTY RESOLUTION OF TEMPLATE PARAMETERS DURING AUTOMATED DOCUMENT GENERATION PROCESSING

RELATED APPLICATIONS

The present application is related to co-pending U.S. patent application Ser. No. 18/087,620 titled "HANDLING COLLABORATION AND GOVERNANCE ACTIVITIES THROUGHOUT THE LIFECYCLE OF AUTO-GENERATED CONTENT OBJECTS", filed on even date herewith, which is hereby incorporated by reference in its entirety.

TECHNICAL FIELD

This disclosure relates to collaboration systems, and more particularly to techniques for handling collaboration and governance activities throughout the lifecycle of auto-generated content objects.

BACKGROUND

Automated document generation techniques have been under ongoing development since the earliest days of computerized databases. Over time, much attention has been devoted to developing features that intelligently substitute computer processing for human processing, thus relieving the human operators from the tedious tasks of, for instance, copy-paste operations, data input (e.g., typing in field values), etc. As computer software has become more and more sophisticated, more and more time-saving techniques have been implemented. For example, some electronic document generation systems use graphical user interface (GUI) forms that have fields, which fields can be auto-populated based on results of a database query. As another example, more advanced electronic document generation systems use templates that define a document's look-and-feel presentation as well as templated or "boilerplate" paragraphs that are completely or mostly filled-out document passages. Certain more advanced document generation systems combine database queries, form fields, and templated document passages to generate high-quality and sometimes very large electronic documents.

The issue addressed in this disclosure is that, while a lot of attention has been paid to how to assemble such high-quality and sometimes very large electronic documents, legacy approaches do not consider how to efficiently manage the overall lifecycle of such auto-assembled electronic documents. More particularly, legacy approaches fail to consider how to control distribution and access to such generated electronic documents.

When generated electronic documents are used within a collaboration ecosystem, the number of issues pertaining to how the generated document is handled throughout the overall lifecycle of the document explodes. For example, when the foregoing collaboration ecosystem includes a file system, the possibilities as to how the generated document is to be handled for any particular author, editor or reader and/or the possibilities as to how the generated document is to be handled with respect to any policies or procedures or workflows increases unboundedly.

Unfortunately, needed feature developments in legacy document generation systems have not kept pace with advances on collaboration system ecosystem development. Therefore, what is needed is a technique or techniques that address these deficiencies.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for handling collaboration and governance activities throughout the lifecycle of generated content objects, which techniques advance the relevant technologies to address technological issues with legacy approaches. More specifically, the present disclosure describes techniques used in systems, methods, and in computer program products for associating allow/deny permissions to collaboration activities that apply to generated content objects. Certain embodiments are directed to technological solutions for associating sets of item-specific security and governance policies to generated content objects.

The disclosed embodiments modify and improve over legacy approaches. In particular, the herein-disclosed techniques provide technical solutions that address the technical problems attendant to defining and enforcing permissions and policies over generated content objects. Such technical solutions involve specific implementations (e.g., data organization, data communication paths, module-to-module interrelationships, etc.) that relate to the software arts for improving computer functionality.

The ordered combination of steps of the embodiments serve in the context of practical applications that associate sets of security and governance policies to generated content objects. As such, the disclosed techniques for associating sets of security and governance policies to computer-generated content objects overcome long-standing yet heretofore unsolved technological problems that arise in the realm of computer systems.

Many of the herein-disclosed embodiments for associating sets of item-specific security and governance policies to generated content objects are technological solutions pertaining to technological problems that arise in the hardware and software arts that underlie collaboration systems. Aspects of the present disclosure achieve performance and other improvements in peripheral technical fields including, but not limited to, automated content object workflow processing and human-machine interfaces.

Some embodiments include a sequence of instructions that are stored on a non-transitory computer readable medium. Such a sequence of instructions, when stored in memory and executed by one or more processors, causes the one or more processors to perform a set of acts for associating sets of item-specific security and governance policies to generated content objects.

Some embodiments include the aforementioned sequence of instructions that are stored in a memory, which memory is interfaced to one or more processors such that the one or more processors can execute the sequence of instructions to cause the one or more processors associate sets of item-specific security and governance policies to generated content objects.

In various embodiments, any combinations of any of the above can be organized to perform any variation of acts for associating allow/deny permissions to collaboration activities that apply to generated content objects, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 1A1 exemplifies an environment in which the disclosed embodiments can be practiced.

FIG. 1A2 shows an example composition of a generated content object, according to an embodiment.

FIG. 2 shows a processing flow as used in systems that tag generated content objects before invoking downstream processing, according to an embodiment.

DETAILED DESCRIPTION

Figure 1B:
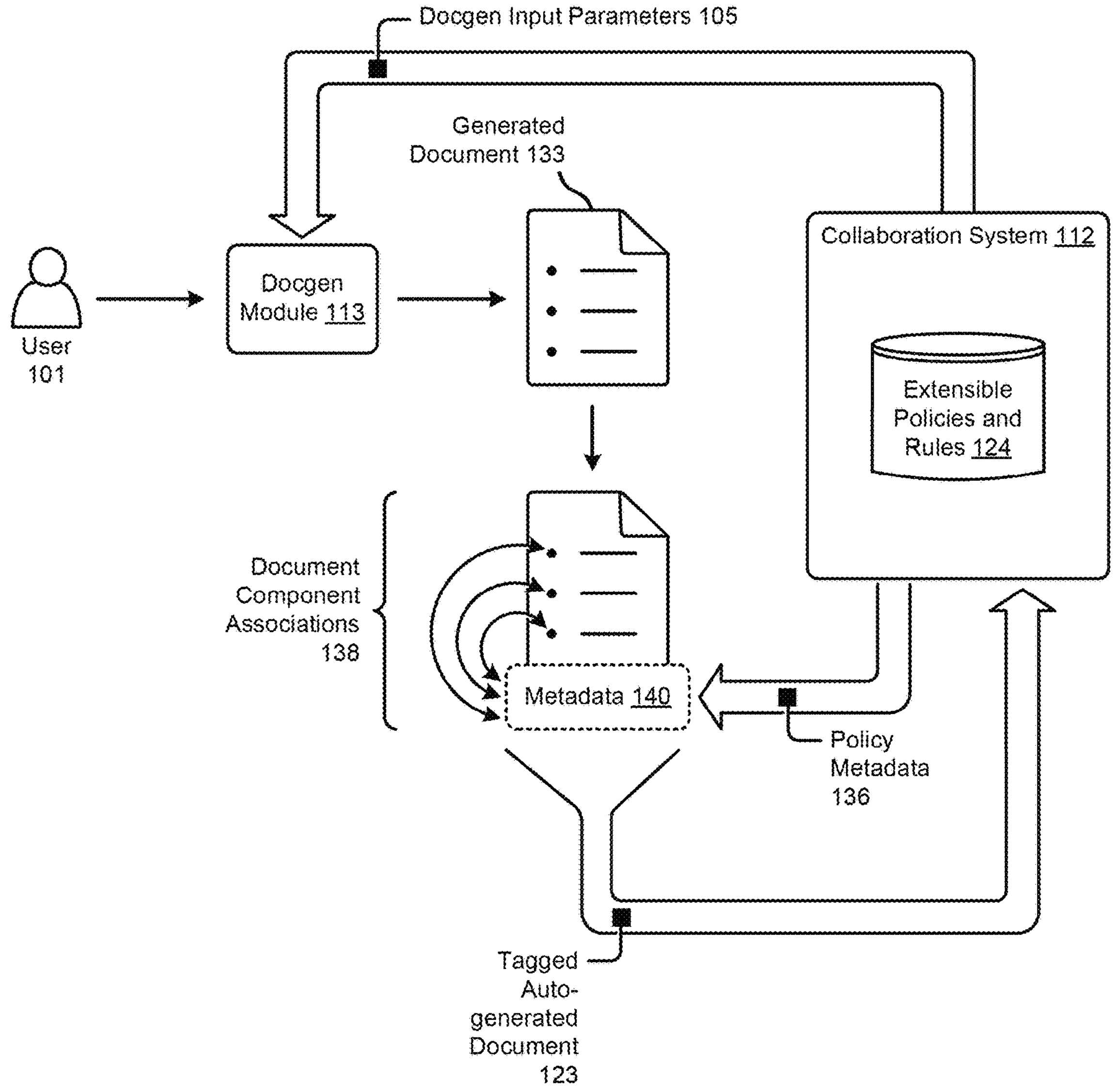
FIG. 1B exemplifies a data flow as used in systems that associate metadata tags with a generated document, according to an embodiment.

Aspects of the present disclosure solve problems associated with using computer systems for defining and enforcing permissions and policies over generated content objects. These problems are unique to, and may have been created by, various computer-implemented methods used in collaboration systems. Some embodiments are directed to approaches for associating sets of item-specific security and governance policies to generated content objects. The accompanying figures and discussions herein present example environments, systems, methods, and computer program products for associating allow/deny permissions to collaboration activities that apply to generated content objects.

Overview

In collaboration systems, when a new content object is generated (e.g., from many different forms and/or using many different templates and/or using information from external corpora) the collaboration system needs to know how the newly generated content object should be handled in the collaboration setting. Moreover, it needs to know how the newly generated content object should be handled even before initiating any collaboration activities. Still further, the collaboration system needs to know, at the time of auto-generation, how the newly generated content object should be handled over the overall lifespan of the generated content object.

Prescribing the Scope of Collaboration Activities Based on Content Analysis As an example, suppose that a Business Unit General Manager (GM) seeks to assemble a contract that includes information derived from multiple sources, including information derived from a third party. In this case, signatories to the contract and/or other participants in the "Deal" (whether third party or not) should be collaborated into (e.g., collabed-into) the generated content object. As can be seen from the foregoing, it is not known how to constitute a collaboration group that applies to the generated contract. In this example, it cannot be known until after assembling the generated content object, who should be included in the collaboration group.

Restricting the Scope of Collaboration Activities Based on Security Clearances As yet another example, suppose that that same Business Unit GM generates a contract exhibit that includes or derives from a content object that is subject to a "Secret" security classification. In this case, only signatories to the contract and/or other participants in the "Deal" who have a "Secret" or higher security clearance should be permitted to access the generated content object; others should be excluded from the collaboration activities. As can be seen from the foregoing, it is not known—until the contract exhibit is incorporated into the generated content object—how to restrict collaboration activities so as to enforce access to the generated content object in accordance with applicable security clearances.

Recipient-Specific Redaction of Portions of Generated Content Objects

In some settings, a web meeting is used to foster collaboration among many participants in the web meeting session. Based on the range of collaborators, their enterprise affiliation, their role in the enterprise, and so on, it sometimes happens that a slightly different document is autogenerated based on (1) the sensitivity level or security level of specific passages of the document and/or (2) the sensitivity level or security clearance of a particular web meeting session participant. To illustrate, consider a contract being discussed where an exhibit of the contract includes a list of suppliers. Further, consider that the list of suppliers is marked as being "Eyes Only" for only those who possess a particular security clearance (e.g., "Confidential"). Accordingly, in the event that a content object deep inspection module detects the presence of such "Eyes Only" clearance-designated passages (e.g., all or portions of the foregoing exhibit), then those "Eyes Only" clearance-designated passages need to be redacted such that those passages are presented only to web meeting participants who have the necessary security clearance. It should be noted that the web meeting collaboration activities that are allowed or denied can be applied only after processing the particular generated document with respect to the individual web meeting participants.

Further details regarding general approaches to automated redaction are described in U.S. application Ser. No. 17/816,329 titled "CONTENT MANAGEMENT SYSTEM INTEGRATIONS WITH WEB MEETINGS" filed on Jul. 29, 2022, which is hereby incorporated by reference in its entirety.

Of course there are other cases where it is not known until during or after the time when the content object item is being (or has been) generated how or when (or by whom) the various collaboration activities should be allowed (or denied) to be performed over the generated content object. What is needed are techniques for handling collaboration activities based on aspects of generated content objects in combination with other aspects of a collaboration system.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiment even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

As used herein, a "collaboration system" is a collection of executable code that facilitates performance of a set of coordinated functions, workflows, tasks or other activities on behalf of a plurality of collaborating users that operate over shared content objects. More specifically, a collaboration system facilitates collaboration activities such as creating and sharing a shared content object and establishing a set of users who can access the shared content concurrently. In some embodiments as contemplated herein, a "collaboration system" is implemented as a set of computer-implemented modules that interoperate to capture, store, and provision access to electronically-stored data that is associated with a history of access/sharing events taken over shared content objects. Access by users to individual ones of the content objects of a collaboration system is controlled by collaboration group settings.

As used herein, a collaboration group refers to any set of identifiers pertaining to users of a collaboration system. Such identifiers may include usernames, email aliases, user device identification information, etc. A collaboration group can be associated with any number of attributes and attribute values, and such attributes and attribute values can be inherited by the members of a particular collaboration group. The constituency of a collaboration group serves to aid in cooperative activities over collaboration system documents and metadata.

As used herein, a "content object" is any computer-readable, electronically-stored data that is made accessible to a plurality of users of a collaboration system. Different collaboration system users may each have respective permissions. Individual items of electronically-stored data may be associated with any number of access parameters that are used to allow or deny or otherwise control whether or not a particular user can perform various operations over the individual items of electronically-stored data. The electronically-stored data may be structured as a file, or as a folder/directory, or as metadata, or as a combination of the foregoing. The electronically-stored data might be or might not be human intelligible. Moreover it can happen that some parts of a content object are human intelligible, while other parts of the same content object are not human intelligible. This can happen, for example, when a content object is composed of a mixture of Unicode character data as well as binary data. A collaboration system differs from an ordinary storage system at least in that many sharing semantics of a collaboration system do not even exist in an ordinary storage system. For example, one hallmark of a collaboration system is that it manages collaboration activities between specifically-defined collaborators whereas ordinary storage systems, or even cloud-based storage system do not. More explicitly, whereas an ordinary storage system merely manages access based on READ, WRITE, EXECUTE, DELETE (RWED) access bits, in a collaboration system, access to content objects is managed in accordance with a plurality of high-level sharing semantics and/or sharing policies. As another example, being explicitly invited to share access to a content as a collaborator does not even exist in an ordinary cloud storage system. Moreover, in a collaboration system, each READ access would check for membership in a collab group, which is different from merely allowing or denying access based on a RWED access bits, As used herein, "content object deep inspection" refers to analysis of human-readable intelligence by considering the meaning of human-readable words within a collaboration object.

As used herein, the term "collaboration activities" refers to actions that involve two or more users who access the same content object of a collaboration system in the same time period. Strictly as examples, term "collaboration activities" refers to any one or more of (1) participating in a web conference, (2) participating in a multi-user real-time document editing session, etc.

Details regarding general approaches to participating in real-time document editing are described in U.S. application Ser. No. 15/957,411 titled "CALCULATING AND PRESENTING USER-SPECIFIC DIFFERENCES" filed on Apr. 19, 2018, which is hereby incorporated by reference in its entirety.

As used herein a "document" is a content object that contains at least some portions that are human intelligible. Strictly as an example, a Microsoft WORD file can be stored as a content object, where that Microsoft WORD file contains human readable portions (e.g., contract terms and conditions) as well as binary-coded portions (e.g., metadata pertaining to the file itself, and/or metadata pertaining to the human readable portions) that are not represented in a manner to be decoded as ASCII or other human readable symbols.

As used herein the term "collaboration permissions" refers to a data structure that serves to control how a generated content object is permitted (or denied) to be subjected to collaboration activities.

Descriptions of Example Embodiments

FIG. 1A1 exemplifies an environment in which the disclosed embodiments can be practiced. As an option, one or more variations of environment 1A100 or any aspect thereof may be implemented in the context of the architecture and functionality of the embodiments described herein and/or in any environment.

The figure is being presented to illustrate one example flow of how a newly generated content object (e.g., generated content object 132) can be analyzed to the extent that a range of collaboration activities can be defined, characterized as allowed/permitted or denied/disallowed and associated with the newly generated content object. The shown flow through operation 1, operation 2, and operation 3 are merely for illustration; many alternatives are possible, some of which are described infra.

The shown flow commences at operation 1, where a user 101 accesses any one or more GUI forms 103, and/or any one or more various external information sources (e.g., external corpora $\mathbf{151}_1$, external corpora $\mathbf{151}_2$, . . . , external corpora $\mathbf{151}_N$) and/or any one or more content object templates 116, and combines them and/or information within them using a docgen module 113 for generating a content object (e.g., generated content object 132). In addition to the GUI forms 103 and content object templates 116, the generated content object is assembled based on further assets that derive from the collaboration system.

Beyond the shown GUI forms 103, content object templates 116, and user specifications 147 (collectively, docgen inputs), a docgen module may have many additional inputs. Some of such additional inputs are shown as docgen input parameters 105 that comprise information deriving from or pertaining to the collaboration system. Strictly as examples, the docgen input parameters 105 that derive from or pertain to the collaboration system may include (i) metadata 140 of the collaboration system, (ii) a source document identification, (iii) a collab group covering the identified source document, (iv) intended output document name, (v) intended output document folder location, (vi) docgen rules and/or conditionals, (vii) information derived from a third party, (viii) identities of individuals involved in the docgen (e.g., identity of the requestor), etc.

As used herein, a "third party system(s)" or "third party application(s)" comprise applications, microservices or other software-implemented facilities that are not provided and/or maintained by the collaboration system provider, but rather are applications, microservices or other software-implemented facilities that are provided and/or maintained by entities other than the maintainer of the collaboration system. Such "third party system(s)" and/or "third party application(s)" are merely integrated with the collaboration system so as to facilitate interactions pertaining resolution of template parameter values that are used in a document generation scenario.

As used herein a docgen module is a component of a collaboration system that converts a first collaboration system content object into a second collaboration system content object by resolving template parameters of the first collaboration system content object into values that are output into the second collaboration system content object.

Beyond the shown generated content object 132, docgen module 113 has many additional outputs. Some of such additional outputs are shown as docgen output parameters 121 that comprise information to be analyzed by and/or saved to the collaboration system. Strictly as examples, these docgen output parameters may include (i) the datatype and/or other properties of the output generated content object, (ii) workflow flags (e.g., "needsApprovals"), (iii) identification of and/or other properties or characteristics of the user/requestor, (iv) a link to the output folder, (v) artifacts of the docgen process itself (e.g., the version of the docgen module), etc.

Legacy document generation facilities are often deployed as point tools that rely on a huge amount of manual data preparation before a document can be generated. In contrast, when a document generation facility is deployed within or interfaced with a collaboration system, the bulk of data preparation is already done, and even very sophisticated documents can be generated using a wealth of information available from the collaboration system. To explain, in legacy implementations, it often happens that a legacy document generation facility might not have visibility into (1) if or how the resulting document is to be shared or otherwise disseminated, (2) if or how the resulting document is to be handled with respect to security and governance considerations, or (3) how the resulting document is to be handled for retention, etc. Moreover, in legacy implementations, it often happens that a given document generation facility might not have visibility into whether or not any particular combination of information from myriad sources raises the sensitivity of the generated content object.

To address these deficiencies with legacy implementations, and in accordance with the disclosed embodiments, a generated content object, in whole or in part, is subjected to content analysis (operation 2). In this example, and as shown, content analysis is performed by a content analysis module 142 that is situated within a collaboration system 112. Such a content analysis module is configured to ingest docgen I/O (input/output or IO), analyze the generated content object in context of any other docgen I/O, and report analysis results 144 to downstream processing. Downstream processing might entail defining collaboration permissions (e.g., using the shown collaboration scope decision module 146) that control how the generated content object is permitted (or denied) to be processed. In some settings, downstream processing might entail ongoing enforcement of the foregoing permissions or access restrictions 119 over the generated content object 132.

As is understood in the art, once an item is ingested into the collaboration system database (e.g., content object repository 114), it might enjoy a long lifetime, during which lifetime the item needs to be managed securely and in accordance with document control and/or other governance policies. Accordingly, there needs to be some means for defining the range of permissible collaboration activities (operation 3). A collaboration scope decision module 146 can be consulted at any point in time, either during the construction of the generated content object, or once the newly generated content object has been made available as a whole. Collaboration activity restrictions can be associated with the generated content object 132, and such collaboration restrictions can have an affinity to the generated content object 132 throughout its lifetime.

Additionally or alternatively, steps are taken for the purpose of associating document handling requirements and/or collaboration system restrictions, and/or collaboration system permissions to the newly generated content object. For example, collaboration system permissions might include who (e.g., which collaboration system users) can perform collaboration activities over the newly generated content object. Accordingly, collaboration scope decision module 146 can output an enforceably-restricted generated content object 134 as well as an indication of changes to be made to collaboration groups. In some cases, the indication of changes to be made to collaboration groups is in the form of a data item that specifies one or more collaborator list changes 135.

In some cases, the means for associating restrictions or permissions to the newly generated content object is by associating a tag to or with the newly generated content object. Such tags 115 can be of any form such that the representation and/or syntax of a particular tag is associated with one or more corresponding semantics. For example, a tag such as "metadata Value='Confidential'" carries the semantic that any content object that is associated with the tag "metadata Value='Confidential'" is subjected to enforcement in accordance with confidential information governance rules for the underlying enterprise, which governance rules 149 are codified within the collaboration system. In some cases, the newly generated content object is subjected to one or more workflows 145 of the collaboration system.

Figure 2:
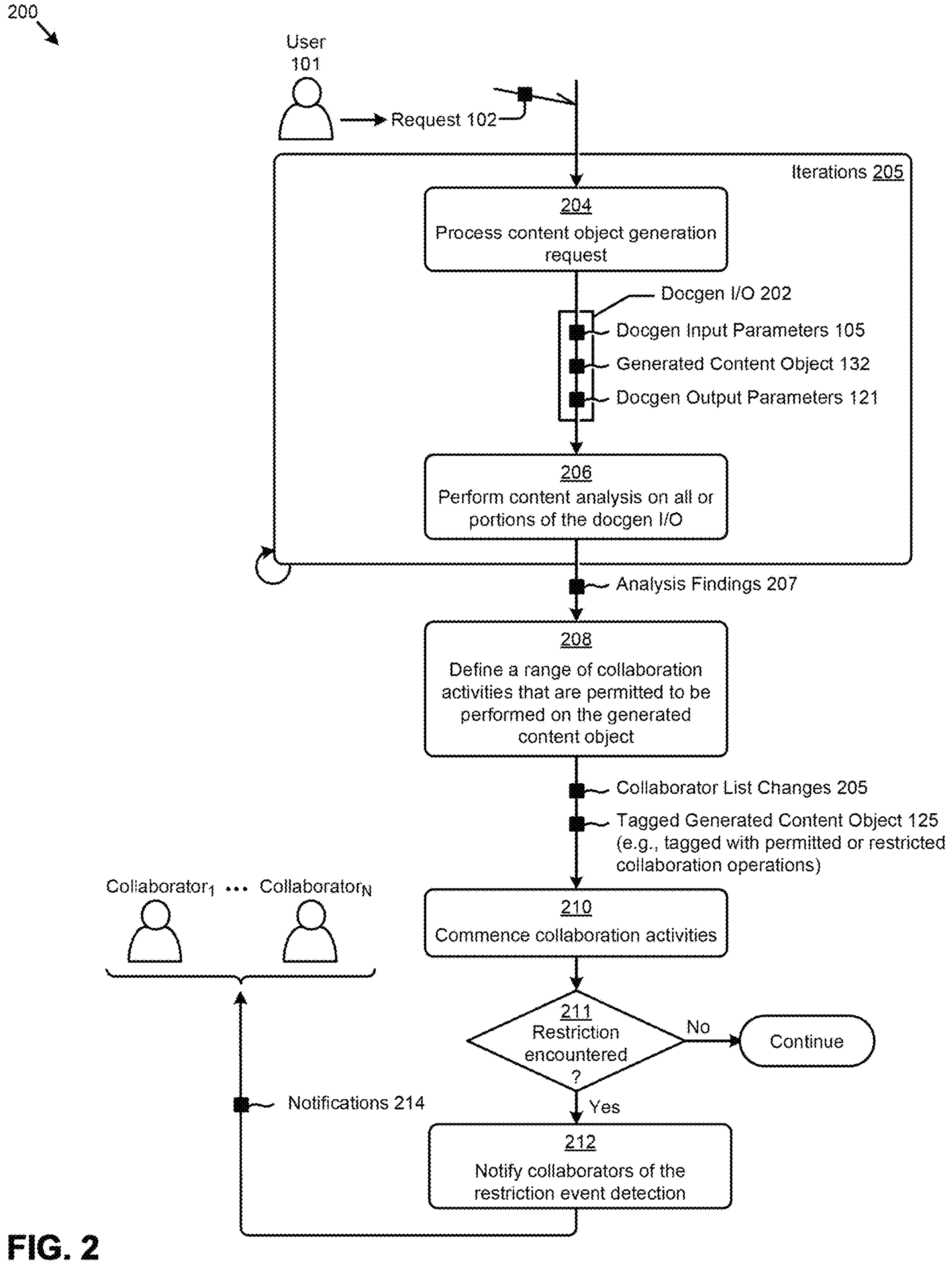

FIG. 1A2 shows an example composition of a generated content object. The figure depicts that a generated content object is composed of a generated document 133 (e.g., one item of the docgen I/O), any of one or more metadata associations 139, any of one or more collaborator associations 141, any of one or more tag associations 143, and any of one or more workflow associations 150. The document component associations 138 can be codified using any known technique.

FIG. 1B exemplifies a data flow as used in systems that associate metadata tags with a generated document. As an option, one or more variations of document tagging data flow 1B00 or any aspect thereof may be implemented in the context of the architecture and functionality of the embodiments described herein and/or in any environment.

The figure is being presented to illustrate how all or portions of an automated document generation system can be interfaced with a collaboration system. Moreover, the figure is being presented to illustrate how various types of metadata 140 can be associated with specific subsets or portions or passages of a generated document 133 that is assembled by, for example, docgen module 113. The figure depicts the specific embodiment where document component associations 138 are made by tagging certain passages of a generated document 133.

As previously described, one possible generated output of the collaboration scope decision module 146 of FIG. 1A1 is an enforceably-restricted content object item. In some cases, permissions (e.g., permissions that apply to the foregoing enforceably-restricted content object item) are specific to subsets or portions or passages of a generated content object. One possible way to handle enforceability at the granularity of a subset or portion or passage is to define fine-grained division boundaries that correspond to subsets or portions or passages of a generated document, and then associate metadata to those fine-grained division boundaries. One approach to doing so is shown and described as pertains to FIG. 1B.

In the embodiment of FIG. 1B, metadata 140 is shown as being attached to a generated document 133 to form a tagged auto-generated document 123. Such attachment may be implemented by adding structures to the document (e.g., using an extensible structured markup language (XML), inline comments, invisible text, etc.). Additionally or alternatively, such attachment or association may be implemented by adding attributes to an index (e.g., file system index) or by adding fields to a schema (e.g., and storing values in database records).

The information that comprises metadata might derive directly from extensible policies and rules 124, and/or the information that comprises metadata might derive indirectly based on an evaluation of a policy and/or rule with respect to any information available in the collaboration system 112. In some cases, whether or not a policy is currently or potentially applicable to a generated document or whether or not a rule is currently or potentially applicable to a generated document can be determined using any known method. In embodiments such as shown and described as pertains to FIG. 1A1 and FIG. 1B, the determination as to whether or not a policy is currently or potentially applicable to a generated content object or whether or not a rule is currently or potentially applicable to a generated content object can be determined using any sort of content object metadata generator (e.g., the content object metadata generator 148 of FIG. 1A1).

Association of metadata 140 to a generated document can be derived from application of the extensible policies and rules 124 within collaboration system 112. In some cases a policy or its corresponding policy metadata 136 is carried within a particular generated document to generate a tagged auto-generated document 123. In other cases a policy or its corresponding policy metadata 136 is tagged on to a particular generated document to generate a tagged auto-generated document 123. As shown, a tagged auto-generated document is entered into the collaboration system. The tags themselves and/or associations between the tags and certain portions of the generated document serve to inform how the collaboration system processes the generated document over its remaining lifetime.

Figure 1C:
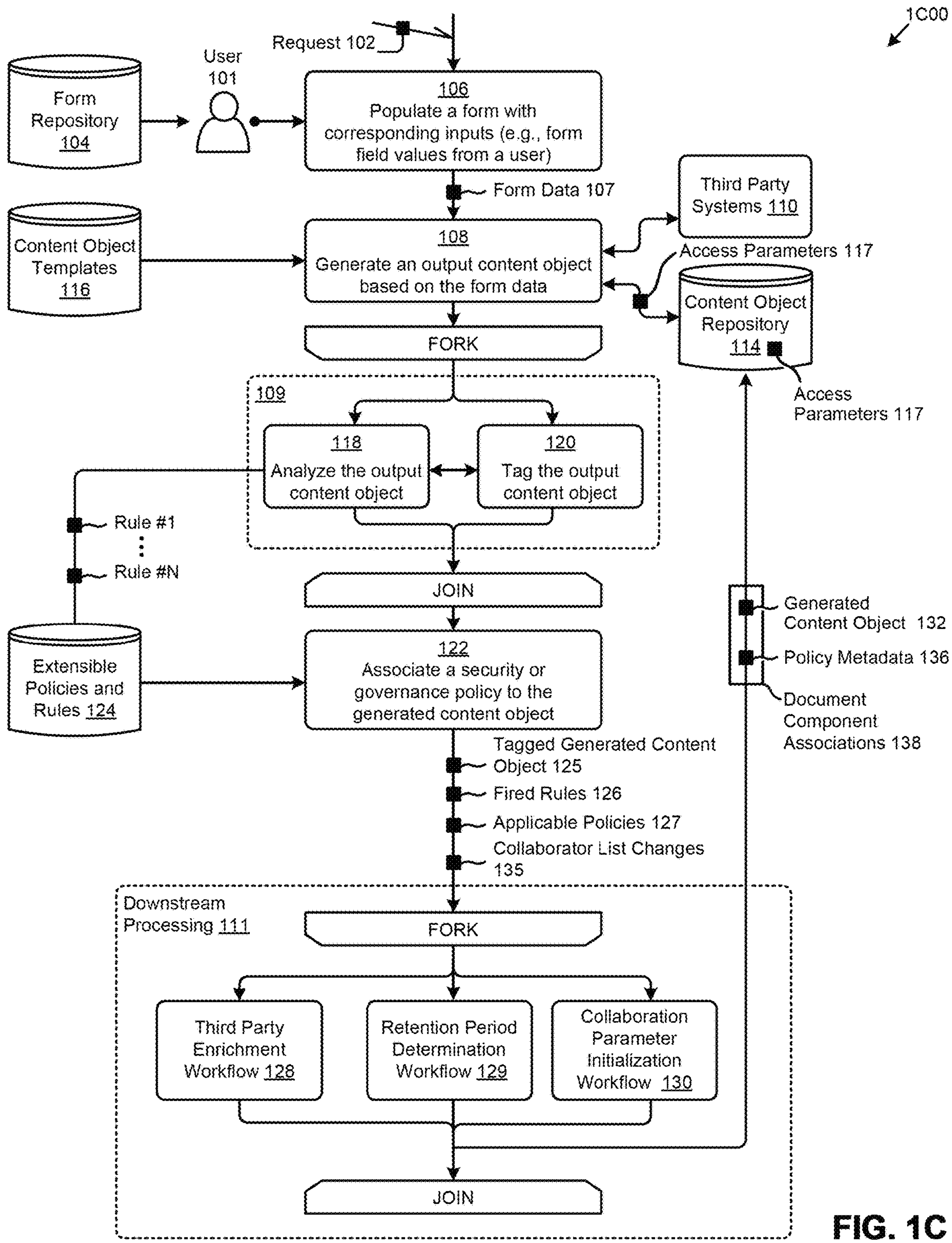
FIG. 1C exemplifies a cradle-to-grave data flow as used in systems that associate sets of security and governance policies with a generated content object, according to an embodiment.

FIG. 1C exemplifies a cradle-to-grave data flow as used in systems that associate sets of security and governance policies with a generated content object. As an option, one or more variations of processing data flow 1C00 or any aspect thereof may be implemented in the context of the architecture and functionality of the embodiments described herein and/or in any environment.

The figure is being presented to illustrate initial creation and ongoing processing of a generated content object. More specifically, the figure is being presented to illustrate how initial creation and enrichment of a newly created auto-generated content object and its associated metadata can inform downstream collaboration system processing of any sort. Moreover, the figure is being presented to explain how a newly created auto-generated content object and its metadata can be ingested into a content object repository 114.

The shown flow commences upon receipt of a request 102, which request might be raised automatically by any module of the collaboration system, or by a user-raised request by a collaboration system participant (e.g., user 101). A request might include a designation of a particular form to be accessed from the shown form repository 104, and/or a request might include designation of a particular template to be accessed from the shown content object templates 116, and/or a request might include within itself a sufficiency of information needed to populate the designated form. In some cases, the information needed to populate the designated form is presented as structured data (e.g., in XML).

As shown, processing of the request might include one or more steps (e.g., step 106) to generate an output document based on (1) a form (e.g., a form with fields to be populated), and/or (2) information retrieved from a set of content object templates 116, and/or (3) the provided form data 107, and/or (4) other information derived directly or indirectly from third party systems 110 and/or from a panoply of content objects.

During the process of auto-generation of the output content object (step 108) and/or after the process of auto-generation of the output content object, the output content object can be associated with any number of access parameters 117. Furthermore, during the process of auto-generation of the output content object (step 108) and/or after the process of auto-generation of the output content object, the output content object can be analyzed and tagged. Strictly as an implementation example, fork-join block 109 depicts two concurrently running processes, i.e., a first process to analyze the output content object (process 118) and a second process to tag the output content object (process 120). The two processes in the fork-join block can communicate with each other. In some cases, the analysis process may emit rules (e.g., rule #1, . . . , rule #N) that are ingested into a repository of extensible policies and rules 124. These extensible policies and rules may in turn be accessed and processed (e.g., in step 122) for the purpose of associating one or more security and/or governance policies to the generated content object.

As shown, the output of step 122 includes a tagged generated content object 125 as well as a list of fired rules 126, a list of applicable policies 127, and a set of collaborator list changes 135. The foregoing fired rules and list of applicable policies can be used to inform downstream processing 111. Strictly for illustrative purposes, FIG. 1C depicts possible workflows that can be invoked with the tagged generated content object 125 (or reference thereto) as a subject content object. The shown possible workflows are merely different workflows that may occur in various collaboration systems. The first workflow (third party information enrichment workflow 128) involves sending/receiving information to/from a third party so as to enrich the tagged generated content object and/or its corresponding metadata based on information retrieved from a third party system. Performance of the second workflow (retention period determination workflow 129) serves to set a retention period on the tagged generated content object. A retention period is a time duration during which a subject content object is to be stored even though a user might delete a copy of the subject content object. Such a retention period might be a default retention period, or it might be a retention period that is calculated or otherwise derived from information available from the metadata that is associated with the tagged generated content object 125. The third workflow (collaboration parameter initialization workflow 130) involves evaluating policies and/or rules over the tagged content object so as to establish collaboration parameters with initial values. The specific values of such collaboration parameters serve to inform the collaboration system how to operate over a subject content object.

In some cases the values of such collaboration parameters serve to expand or restrict the range of collaborators, whereas in some cases the values of such collaboration parameters enable (e.g., allow) or disable (e.g., deny) certain collaboration activities, while still in other cases the values of such collaboration parameters merely add or adjust pre-existing collaboration parameters.

Any number of rules can be applied to any number of portions of any generated content objects. Moreover, any number of policies and/or rules can be stored as extensible policies and rules 124. Further, any number of policies or rules can be added to the set of extensible policies and/or deleted from the set of extensible policies and rules.

Such policies can be brought to bear based on a wide variety of collaboration system events. Strictly as an example, localization of a set of policies might cause introduction of new policies. More particularly, a policy stated as, "IF over US$100 THEN Secure Approvals" might be localized as "IF over €125 THEN Secure Approvals."

Figure 1D:
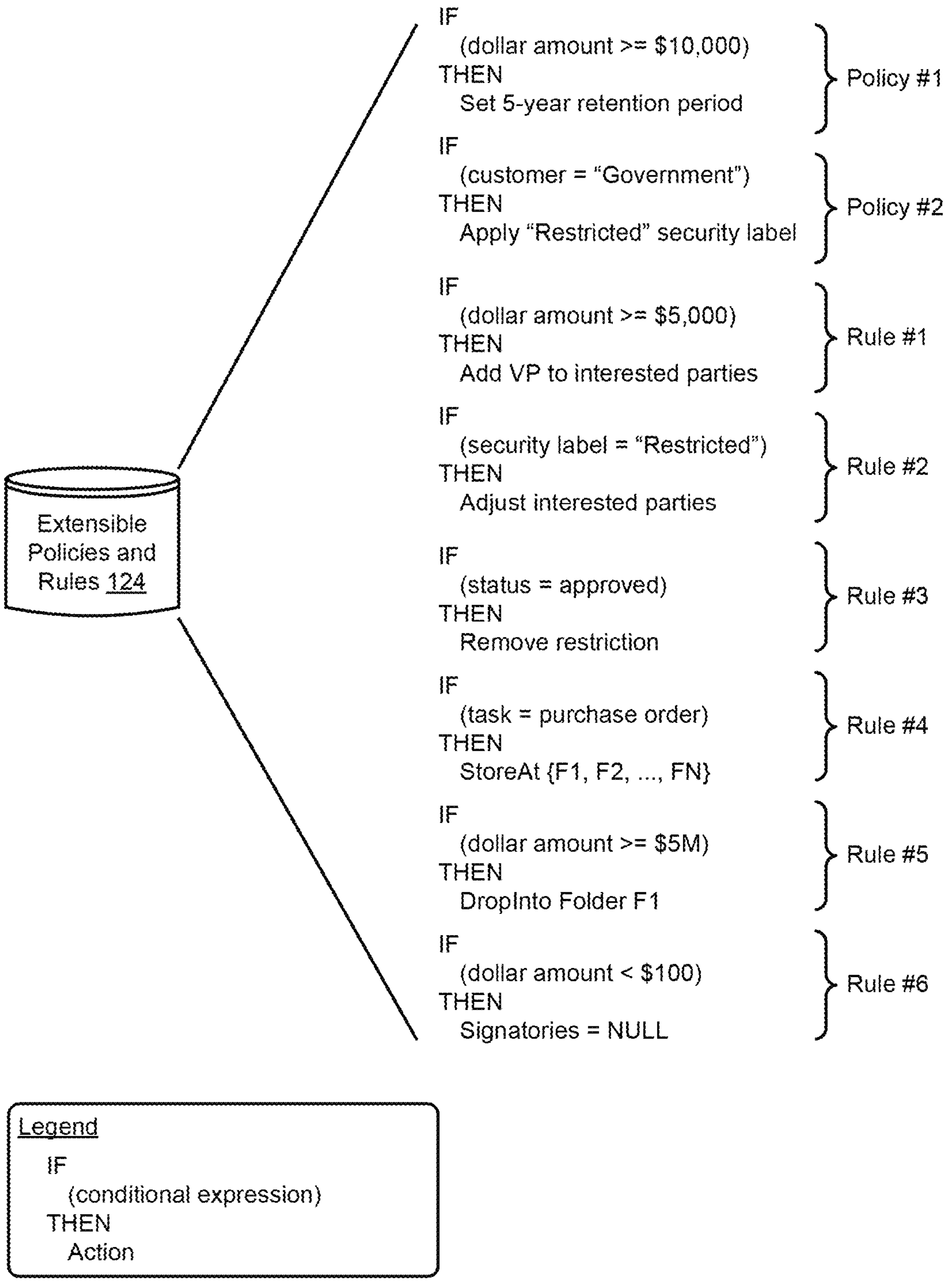
FIG. 1D shows examples of policies and rules as used in systems that associate sets of security and governance policies with a generated content object, according to an embodiment.

FIG. 1D shows examples of policies and rules as used in systems that associate sets of security and governance policies with a generated content object. Such policies and rules or any aspect thereof may be implemented in the context of the architecture and functionality of the embodiments described herein and/or in any environment.

As used herein, policies are implemented/enforced in the same ways that rules are implemented/enforced. Specifically, both policies and rules comport to the syntax, "IF (conditional expression is TRUE) THEN Action". Policies are rules that are established by entities outside of the collaboration system administrators. In some cases, policies correspond to governance rules that are established by government sanctioned compliance-enforcement bodies such as the Securities and Exchange Commission (SEC).

As shown, policy #1 deals with governance of a retention period of a particular content object. In the specific case of policy #1, a 5-year retention period is established if/when the subject content object has a dollar amount greater than $10,000. Policy #2 applies a "Restricted" label to a subject content object if the content object is tagged with metadata "Customer='Government'".

The foregoing policies are merely example policies. Further, the following discussion of selected rules are merely examples to illustrate one possible range of rules that can be enforced in a collaboration system. The policies and rules are extensible, at least in the sense that any new policy and/or any new rule can be codified at any time. Furthermore the parameters (e.g., conditional expressions or actions) of any existing policy or rule can be modified at any moment in time. For example, Rule #1 is codified as "IF (dollar amount>=$5,000) THEN Add VP to interested parties". In this case the parameter "$5,000" might be changed to "$10,000". Additionally or alternatively, the parameter "VP" might be changed to "GM".

A rule or rules might pertain to distribution based on security finding (e.g., Rule #2), or a rule or rules might pertain to approvals and restrictions (e.g., as exemplified by Rule #3), or a rule or rules might pertain to where to store the generated content object based on some conditional expression (e.g., as exemplified by Rule #4), or a rule or rules might pertain to a folder describing where to drop the generated content object based on some conditional expression (e.g., as exemplified by Rule #5), or a rule or rules might pertain to if or how e-signing is to be carried out (e.g., as exemplified by Rule #6), or a rule or rules might pertain to any number of conditional expressions/actions.

Evaluation of such policies and rules might occur at any moment in time. In fact, evaluation of such policies and rules might occur repeatedly during ongoing processing flows of the collaboration system. More specifically, tags or other metadata can be associated with a newly generated content object by operation of a function or capability of the collaboration system. One possible processing flow from an initial request to automatically generate a content object, onward to determination of governance requirements that apply to the auto-generated content object, and further onward through to invocation of downstream processing, is shown and described as pertains to FIG. 2.

FIG. 2 shows a processing flow as used in systems that tag generated content objects before invoking downstream processing. As an option, one or more variations of processing flow 200 or any aspect thereof may be implemented in the context of the architecture and functionality of the embodiments described herein and/or in any environment.

The figure is being presented to illustrate how a generated content object can be analyzed during or immediately after auto-generation so as to tag the generated content object prior to commencement of collaboration activities.

As shown, request 102 to auto-generate a content object can be raised (e.g., by user 101) at any moment in time. The request and/or associated information conveys sufficient information to initiate auto-generation (step 204). Auto-generation of a content object can proceed using any known techniques that combine disparate types of data (e.g., form field data, style and formatting templates, database query responses, pre-developed paragraph templates, logos, media files, etc.) into a single content object (e.g., a contract or other document) for some specific purpose (for collaboration over the auto-generated contract or other document). In addition to the a single content object, performance of step 204 produces various forms of docgen I/O 202.

Gathering of disparate information as might be needed to accomplish the requested auto-generation (e.g., GUI forms, content object templates, etc.) can be accomplished using any known techniques. Moreover, additional information as might be needed to accomplish the requested auto-generation might be gathered incrementally, such that the generated content object 132 can be generated in increments corresponding to iterations 205. Furthermore, successive portions of content that comprise the then-current generated content object can be analyzed incrementally as more portions are auto-generated (step 206). As such, it can happen that any one or more modules involved in the foregoing analysis can be configured for performing content analysis by comparing combinations of individual portions or components of the generated content object. In some cases a portion of a generated document is associated with a passage marker (e.g., to identify a beginning and an end of a passage), and/or a range marker (e.g., to identify a beginning and an end of a multi-passage component).

Strictly as one example of comparing combinations of individual portions or components of a generated content object, a first portion of a generated content object might comprise the title of an officer of a company (e.g., CEO), whereas a second portion might contain an address. In isolation, neither the presence of the title of the officer nor the presence of an address would be deemed to be personally identifiable information (PII); however, in combination, having the title of an officer and an address in proximity might indicate the presence of personally identifiable information. As can be seen, analysis of an newly generated content object might be carried out in a manner that considers all constituent portions (e.g., passages) with respect to all other constituent portions. In this and other embodiments, performance of the operations of step 206 includes emission of analysis findings 207. Such analysis findings might be in the form of metadata to be associated with the generated content object. Additionally or alternatively, such analysis findings might be in the form of interim analysis results that are subsequently considered when defining permissions (or restrictions) pertaining to allowed (or denied) collaboration activities (step 208).

In the embodiment of FIG. 2, the analysis findings that are emitted from performance of step 208 serve to suggest a range of permissible (or disallowed) collaboration activities. Such ranges of permissible (or disallowed) collaboration activities are codified into a tagged generated content object 125 comprising tags, which tags are associated with the subject content object or portions thereof. Once tagged, or more generally once a generated content object or portions thereof are associated with the semantics of various metadata corresponding to the tags, the generated content object is read for commencement into collaboration activities (step 210).

Strictly as examples, collaboration activities might include sharing (e.g., with a collaboration group), editing (e.g., in a collaboration setting such as a web meeting having a virtual whiteboard), augmenting (e.g., by adding further metadata), correlating (e.g., to information derived from a third party), etc.

During the processing of such collaboration activities, it might happen that a particular collaboration activity has been disallowed or otherwise restricted. In such a case, an attempt to perform that particular collaboration activity can be detected (e.g., at test. 211). If a restriction is indeed detected, then the "Yes" branch of decision 211 is taken and affected users (e.g., $collaborator_1$, . . . , $collaborator_N$) are notified (e.g., step 212) via one or more notifications 214. Otherwise, the "No" branch of decision 211 is taken, in which case the processing continues.

Any of the operations and/or decisions as well as any portions of the aforementioned content object analysis can be performed in a collaboration system. One possible embodiment of a content object system and its interfaces with collaborators' user devices is shown and described as pertains to FIG. 3.

Figure 3:
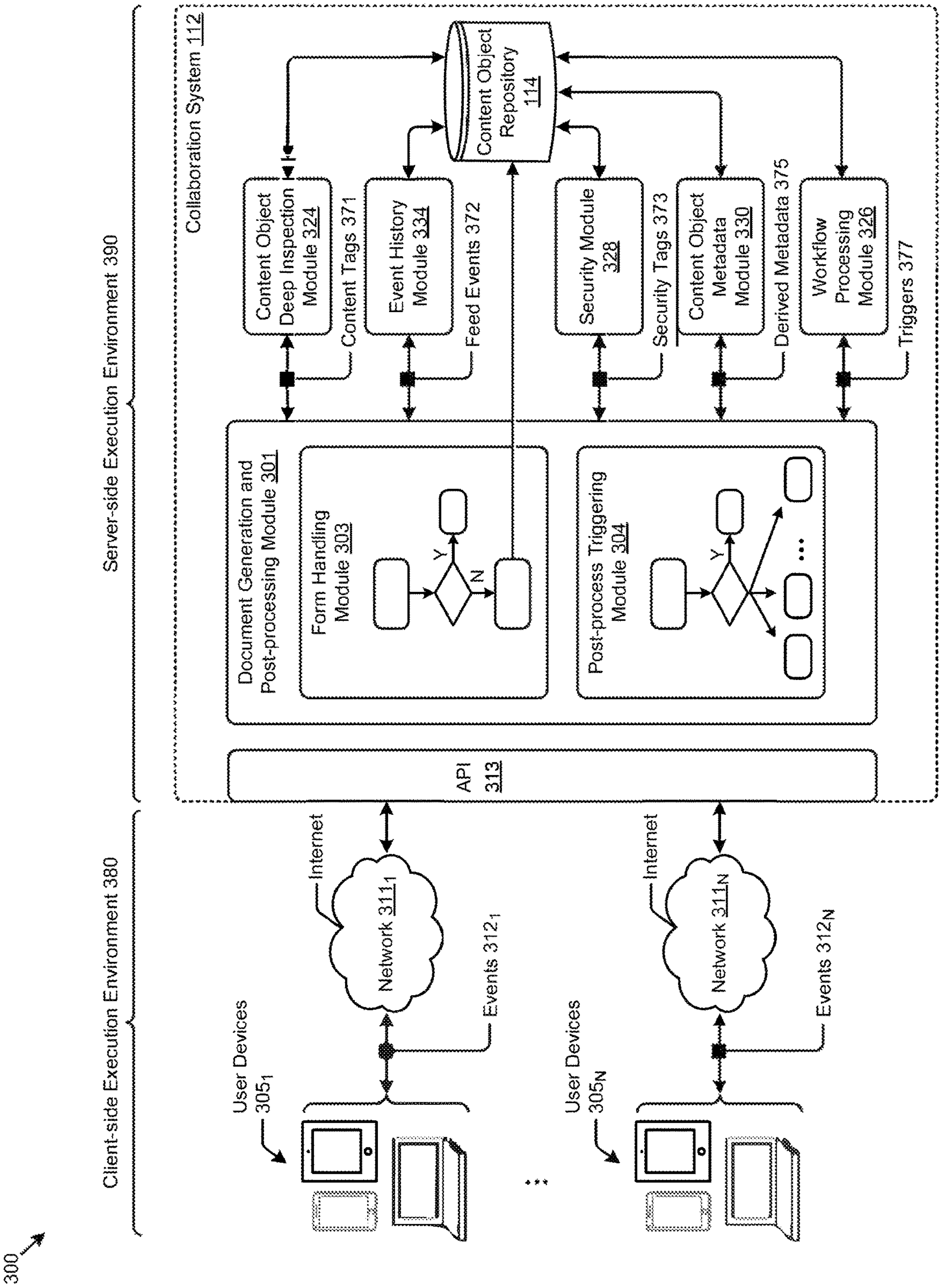
FIG. 3 depicts an example client-server environment in which techniques for processing sets of security and governance policies over a generated content object can be practiced, according to an embodiment.

FIG. 3 depicts an example client-server environment in which techniques for processing sets of security and governance policies over a generated content object can be practiced. As an option, one or more variations of client-server environment 300 or any aspect thereof may be implemented in the context of the architecture and functionality of the embodiments described herein and/or in any environment.

As shown, computing devices (e.g., user devices $\mathbf{305}_1$, . . . , user devices $\mathbf{305}_N$) are situated in client-side execution environment 380. Such computing devices communicate over the Internet (e.g., over network $\mathbf{311}_1$, . . . , over network $\mathbf{311}_N$) via an API 313 integrated with the shown collaboration system 112 that is situated in server-side execution environment 390. The shown collaboration system 112 includes a form handling module 303 which is able to ingress and egress data from any number of collaboration system modules (e.g., content object deep inspection module 324, workflow processing module 326, security module 328, content object metadata module 330, and event history module 334). Any or all of the aforementioned collaboration system modules can access (e.g., for reading, writing, execution, and deletion) content objects of the content object repository 114. Each of the aforementioned modules can be dedicated to a particular set of functions. Some examples of such functions are discussed infra. Different collaboration system users may each have respective permissions, moreover, individual content objects of the content object repository may be associated with any number of access parameters that are used to allow or deny or otherwise control whether or not a particular user can perform a particular operation over a particular content objects of the content object repository. Under collaboration system control, a content object deep inspection module can access particular content objects of the content object repository even if no users have access permissions.

As used herein, "content object deep inspection" refers to analysis of human-readable intelligence by considering the meaning of human-readable words within a collaboration object.

In some embodiments, a collaboration system 112 may include a virtual canvas session management module that is configured to be able to process events that originate from user devices (e.g., events $\mathbf{312}_1$, . . . , events $\mathbf{312}_N$). In some cases, and as shown, events, possibly with corresponding event metadata, are delivered to one or more collaboration system modules. The receiving collaboration system modules may respond by processing the event or events and raising a different event as an output.

Each of the shown collaboration system modules have particular specific functions. Accordingly, the shown I/O that is depicted going out of and into each module is specific to the processing that takes place to accomplish the particular specific functions. To further explain, consider that a particular content object deep inspection module (e.g., the shown content object deep inspection module 324) is configured to be able to detect the presence of personally identifiable information (PII) in the actual contents of any one or more content objects. Accordingly, if/when the content object deep inspection module detects the presence of PII in the actual contents (e.g., the stored bits) of a content object, a post-process triggering module 304 might trigger redaction of that PII before allowing the PII to be accessed by any one of the participants. In some cases, rather than redacting the PII or other sensitive information, the PII or other sensitive information is rendered in only those user devices where the corresponding users do possess sufficient privileges to be able to view such PII or other sensitive information.

As used herein, the term to "render" or "rendering" refers to converting a first set of electronic signals or data into a second set of electronic signals or data that is transduced by a user device in a manner that a user of that user device can hear and/or see a representation of first set of electronic signals or data.

In some situations, content object deep inspection module 324 is able to interpret the contents of a content object such that collaboration-related features or content object passages can be isolated. In some cases, the actual contents of a content object is sufficiently structured such that details—such as schedules, action items, workflow stage gate assessments, workflow triggers, task interrelationships (e.g., task dependencies)—can be used in downstream processing.

Continuing with further illustrative examples, content object metadata module 330 might detect certain characteristics in common between various content objects (e.g., based on the metadata of the various content objects) and determine that certain of those various content objects should be grouped together (e.g., in a grouping of legal documents, in a grouping of video files, etc.).

Still further, and continuing with illustrative examples, event history module 334 might be configured to assess how a particular content object had been accessed in the past. In some such cases, the event history module 334 might make a feed recommendation (e.g., via feed events 372) that are in turn considered by the document generation and post-processing module 301.

Not only can the collaboration system modules perform their respective functions over any content object, but they can also be configured to be able to emit information that can be received by the document generation and post-processing module 301. Strictly as examples, the content object deep inspection module 324 might emit any number of content tags (e.g., content tags 371), the security module 328 might emit any number of security tags 373, the content object metadata module 330 might emit any form of derived metadata 375, and the workflow processing module 326 might emit any number of triggers 377, which triggers might be considered by the document generation and post-processing module 301.

As previously mentioned, any one or more of the collaboration system modules can emit information that is in turn used by other modules of the collaboration system. Strictly as one example, security module 328 might emit a security tag 373 that is new to the system, the emission of which new security tag triggers a workflow processing module.

Figure 4:
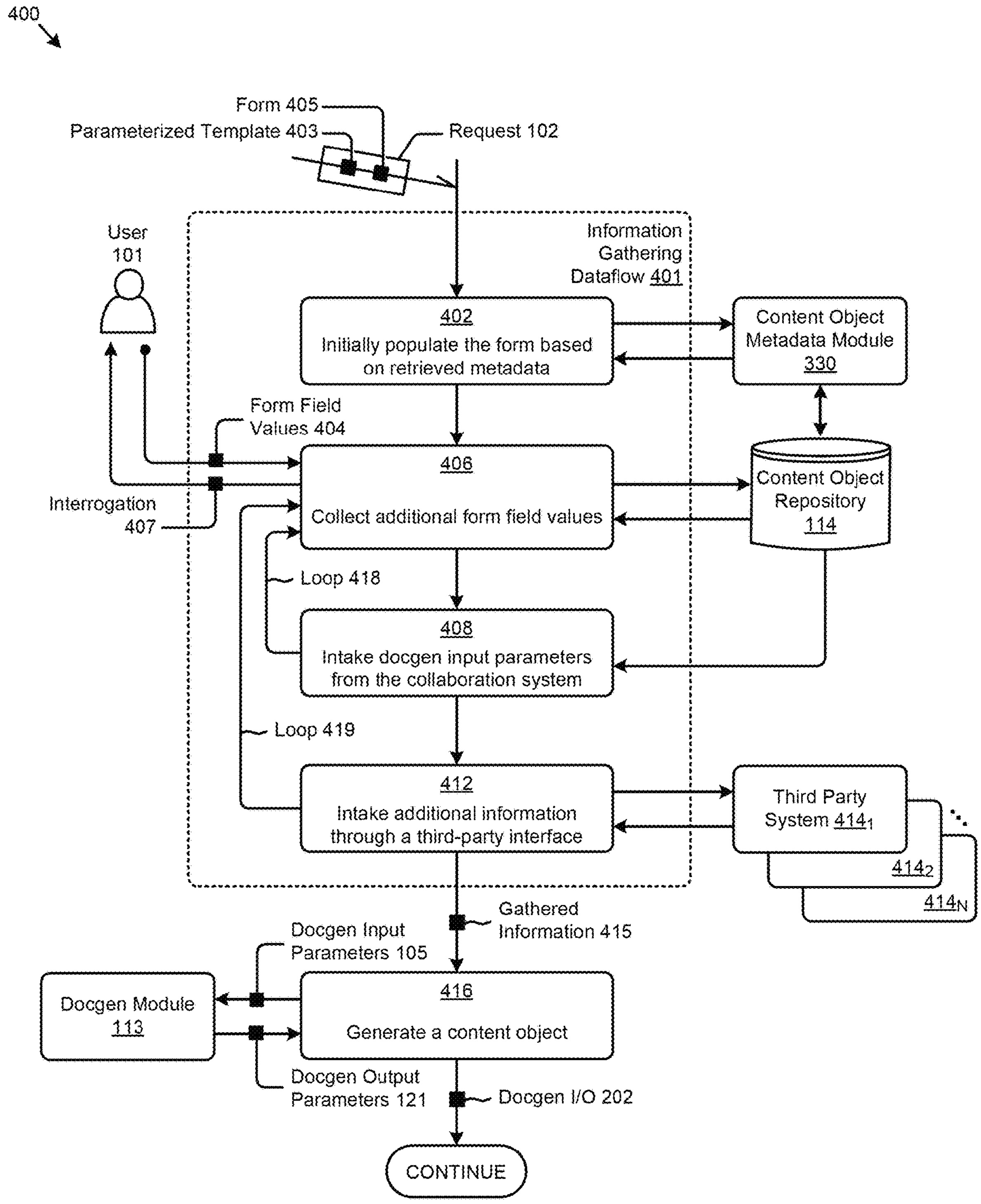
FIG. 4 depicts an example information gathering technique, according to an embodiment.

FIG. 4 depicts an example information gathering technique. As an option, one or more variations of information gathering technique 400 or any aspect thereof may be implemented in the context of the architecture and functionality of the embodiments described herein and/or in any environment.

The figure is being presented to illustrate one possible embodiment for a information gathering dataflow 401. More specifically, the figure is being presented to illustrate one possible technique for gathering information such as might be needed to accomplish auto-generation of a content object.

As shown, request 102 comprises a form 405 and a template 403. The form might comprise one or more fields that can be populated (step 402) using any known technique. In the specific embodiment of FIG. 4, fields of the form can be populated by accessing a content object metadata module 330, which in turn has full access to the full scope of information available in the collaboration system 112 as shown in FIG. 1A1 (e.g., all manner of data of the content object repository 114, any findings from the content object deep inspection module as shown in FIG. 3, any findings from inspection of collaboration groups, etc.).

In some cases, information gathering dataflow 401 collects additional information (step 406) by interrogating a user 101 (e.g., via interrogation 407) to supply information that pertains to form field values 404. Moreover, in some situations, information that is used as a field value enables formation of a query, which query is used to retrieve even still further information from any repository of information of the collaboration system (step 408). In turn, the retrieved information might cause further interactions with user 101 in multiple iterations (e.g., via loop 418). The loop between step 408 and step 406 can be traversed any number of times.

Retrieving information from a repository of information of the collaboration system (step 408) might include applications available that are native to the collaboration system (e.g., web apps, mobile applications, etc.) that are provided and/or hosted by the collaboration system. Additionally or alternatively, information might be retrieved from one or more third party applications that are available (e.g., over a network) in the overall computing environment. Such third party applications are applications that are not provided and/or maintained by the provider of the collaboration system but, rather, are applications that are integrated with the collaboration system to facilitate interactions by and between users of the collaboration system. In this particular embodiment, step 412 serves to intake additional data retrieved from applications or interfaces of third party systems (e.g., third party system $\mathbf{414}_1$, third party system $\mathbf{414}_2$, . . . , third party system $\mathbf{414}_N$). In some environments, a first third party system corresponds to a first entity and a second third party system corresponds to a second entity, and so on. In other environments, the first third party system and the second third party system are owned/operated by the same entity.

Further details regarding general approaches to retrieving information from third party systems are described in U.S. application Ser. No. 16/726,093 titled "EXTENSIBLE WORKFLOW ACCESS" filed on Dec. 23, 2019, which is hereby incorporated by reference in its entirety.

In some cases, the retrieved information causes a loop back (e.g., via loop 419) to cause still further interactions with user 101. The loop between step 412 and step 406 can be traversed any number of times. At some point, a sufficiency of information needed for automated content object generation is deemed to have been gathered. Step 416 provides all or part of the gathered information 415 to an instance of docgen module 113. A generated content object 132 as shown in FIG. 1A1 is then output in a form suitable for further processing.

Determination of which specific metadata is needed for tagging of an auto-generated content object can be based on then-current conditions. One possible implementation of a condition-based metadata gathering technique is shown and described as pertains to FIG. 5.

Figure 5:
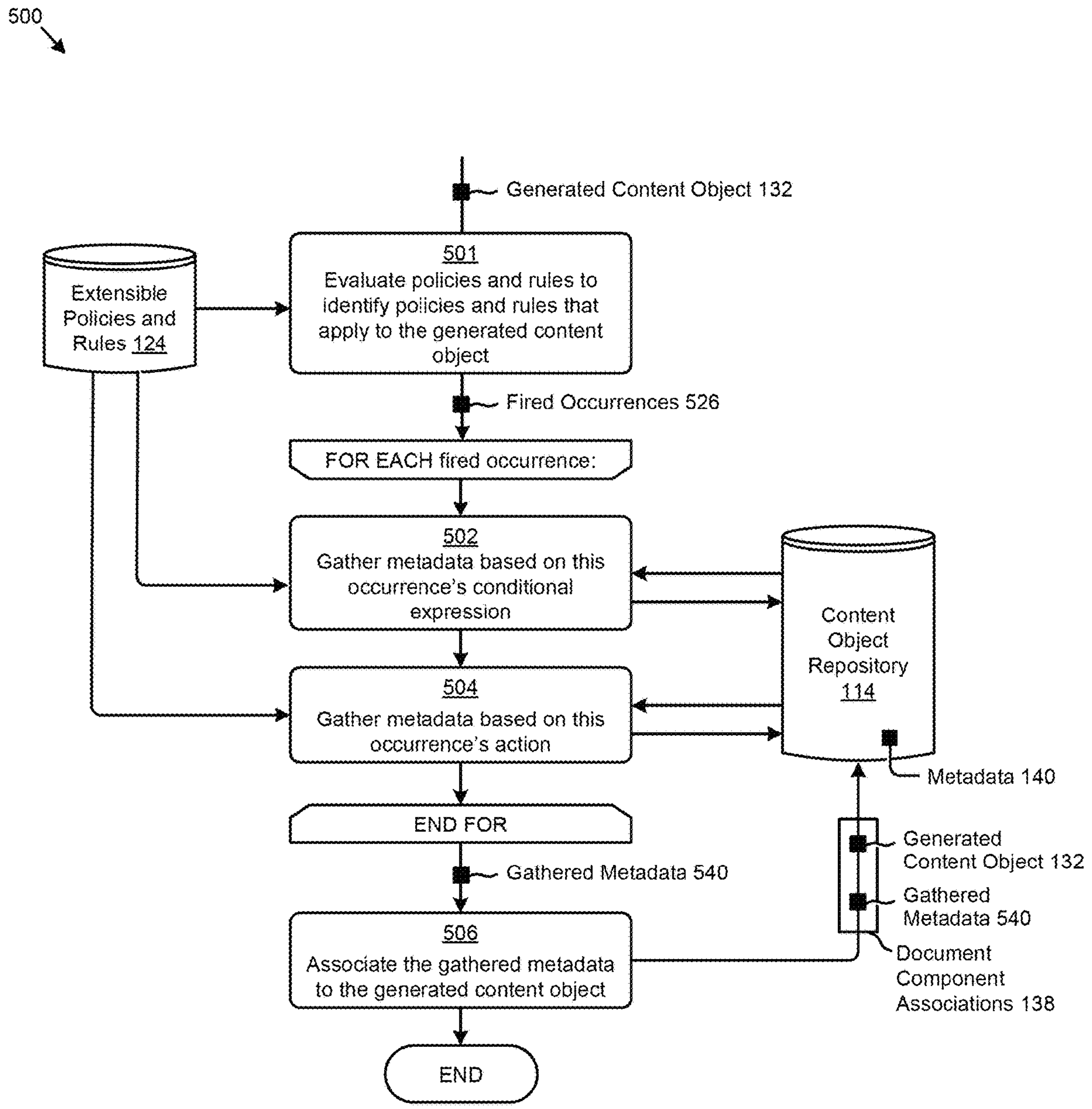
FIG. 5 depicts an example condition-based metadata gathering technique as used in systems that process policies and rules over a generated content object, according to an embodiment.

FIG. 5 depicts an example condition-based metadata gathering technique as used in systems that process policies and rules over a generated content object. As an option, one or more variations of condition-based metadata gathering technique 500 or any aspect thereof may be implemented in the context of the architecture and functionality of the embodiments described herein and/or in any environment.

As shown, condition-based metadata gathering technique 500 commences when a generated content object 132 is presented. Step 501 serves to evaluate policies and/or rules to identify which policies and/or rules apply to the generated content object. The policies and/or rules may originate from any source. Some or all (or none) of the considered policies and/or rules may derive from extensible policies and rules 124. Such policies and rules are evaluated based on then—current conditions. Specifically, when a policy or rule is evaluated, the particular policy or rule's IF conditional expression is tested against any present then-current conditions. If the conditional expression evaluates to TRUE, then the policy or rule is deemed to have "fired". In certain runs of the condition-based metadata gathering technique 500, it can occur that some of the conditional expressions of the policies or rules evaluated to TRUE, which generates fired occurrences 526. Each fired occurrence is further considered to determine what metadata needs to be associated with the subject instance of generated content object 132. Specifically, and as shown, step 502 gathers metadata based on characteristics of the conditional expression of a particular fired policy or rule. The particular metadata gathered might derive from metadata 140 that is stored in content object repository 114, or the particular metadata gathered might derive from metadata accessible via applications or modules of the collaboration system.

In some cases, characteristics of the action portion of a policy or rule is used for gathering metadata. As shown, step 504 gathers metadata based on characteristics of the action portion of a particular fired policy or rule. The particular metadata gathered might derive from metadata 140 that is stored in content object repository 114, or the particular metadata gathered might derive from metadata accessible via applications or modules of the collaboration system.

When the FOR EACH iterations conclude, the gathered metadata 540 is associated with the generated content object (step 506). In some cases, individual constituents or particularly configured sets of gathered metadata are added to or otherwise paired with the generated content object. In the example shown, gathered metadata 540 is associated with the generated content object 132 via one or more document component associations 138 as shown in FIG. 1A2. The generated content object 132, together with the generated content object's corresponding instances of document component associations 138 are stored in content object repository 114.

Once stored into content object repository 114, a particular generated content object 132, together with its associations, can be provided to or otherwise accessed by collaborators and/or by collaboration system components. Many use cases are facilitated by the metadata that is stored in association with corresponding content objects. Some such use cases are shown and described as pertaining to FIG. 6A, FIG. 6B, FIG. 6C, and FIG. 6D.

Figure 6A:
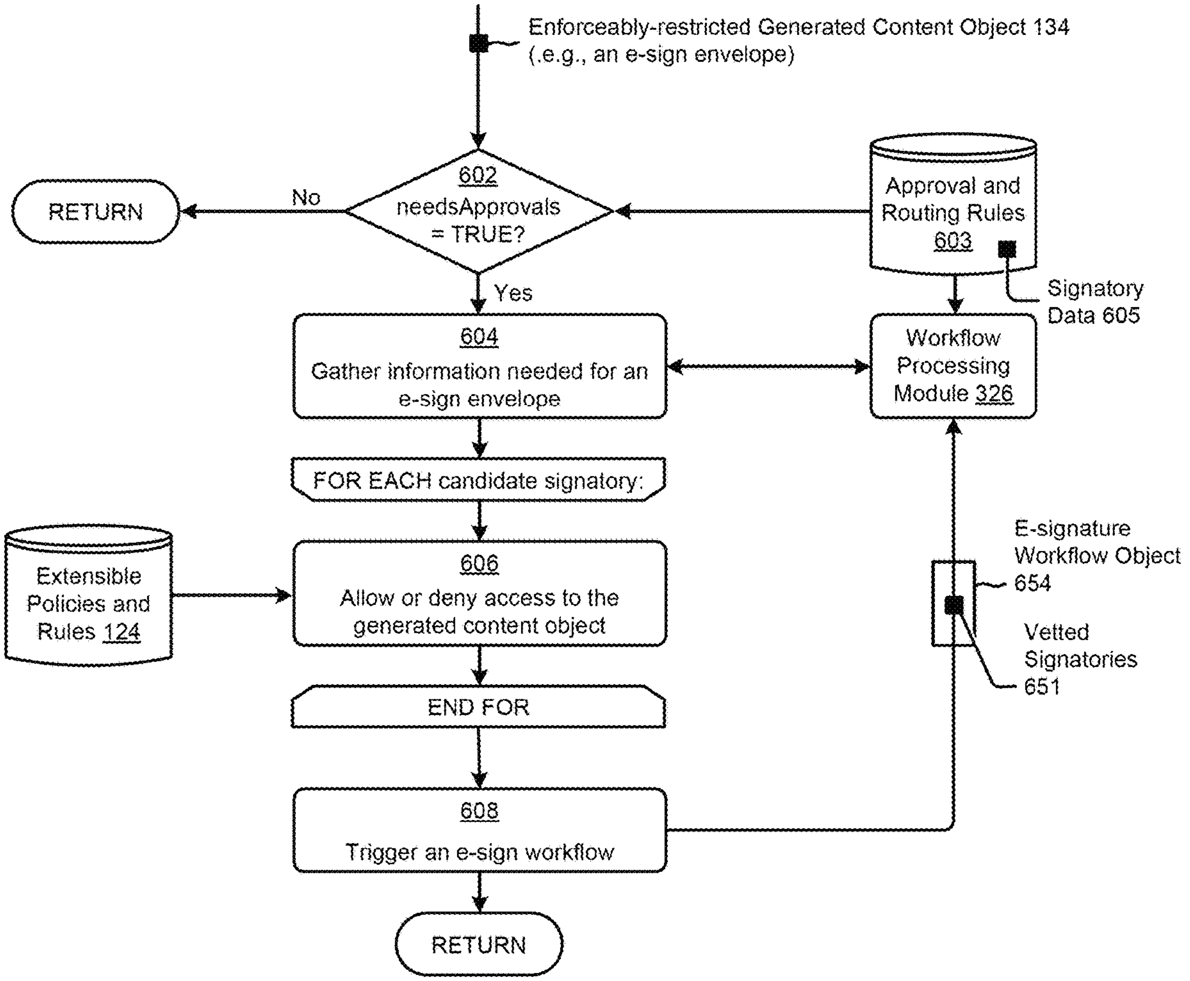
FIG. 6A depicts an example e-signature triggering use case as used in systems that secure e-signatures on a generated content object, according to an embodiment.

FIG. 6A depicts an example e-signature triggering use case as used in systems that secure e-signatures on a generated content object. As an option, one or more variations of e-signature workflow triggering technique 6A00 or any aspect thereof may be implemented in the context of the architecture and functionality of the embodiments described herein and/or in any environment.

The figure is being presented to illustrate how an e-sign workflow can further enrich a generated content object in advance of triggering an e-sign workflow. More specifically, the figure is being presented to illustrate how metadata that is applied or otherwise associated with an auto-generated content object serves to define a range of e-sign activities that are permitted to be performed on the auto-generated content object. In the example shown, the range of e-sign activities that are permitted to be performed on the auto-generated content object are defined, at least in part, on the results of content analysis over the auto-generated content object.

In an e-signing scenario it sometimes happens that all or parts of a content object to be signed are restricted from being viewed or otherwise collaborated over by certain users of an underlying collaboration system. In fact, it sometimes happens that a signatory who was originally slated to be a recipient of an e-sign envelope and/or its contents ends up not having sufficient permissions to view or otherwise collaborate over the e-sign envelope and/or its contents. This can happen, for example, if/when certain "Eyes Only" or otherwise restricted content is brough into an e-sign envelope and/or its contents during an auto-generation process. In such a situation, there needs to be some mechanism for preventing unauthorized collaboration over the e-sign envelope or its contents.

The shown e-signature workflow triggering technique commences upon presentation of an enforceably-restricted generated content object 134 is presented for e-signing. The enforceably-restricted generated content object for e-signing might be a contract, or it might be an embargoed press release, or any other document that is at least potentially subject to one or more approvals.

As shown, check 602 applies logic to determine if the enforceably-restricted generated content object is even subject to e-sign approvals. If the enforceably-restricted generated content object does not need approvals, then the "No" branch of check 602 is taken. On the other hand, the "Yes" branch of check 602 is taken and additional information for an e-sign envelope is gathered (step 604). As shown, the processing of step 604 to gather additional information for an e-sign envelope involves accessing a workflow processing module 326, which in turn accesses a set of approval and routing rules 603. Such approval and routing rules might include signatory data 605. Strictly as one example, a routing rule for an intra-departmental purchase requisition might include identification (e.g., via username, or via email alias, etc.) of a set of candidate signatories as well as routing priorities, routing sequences, alternate signatories, etc.

Next, a FOR EACH loop is entered. Each candidate signatory is checked against any of various corpora of policies and/or rules (step 606), possibly including the shown extensible policies and rules 124. Referring now specifically to the shown extensible policies and rules, and generally to any rules or logic deriving from any of the foregoing corpora, when a rule fires, the particular candidate signatory is processed in accordance with the action of the rule that fired. In some cases, the action of a fired rule serves to allow access to the particular generated content object. Accordingly, that particular candidate signatory is added to the e-sign envelope. In other cases, the action of a fired rule serves to deny access to the particular generated content object. Accordingly, that particular candidate signatory is expunged from the e-sign envelope. This FOR EACH loop continues until all candidate signatories have been considered, after which time all of the candidate signatories are deemed to have been vetted, at least to the degree that an e-sign workflow can be triggered (step 608). In some embodiments, the foregoing e-sign workflow is triggered on the basis of the creation and presentation of an e-signature workflow object 654. In the particular example embodiment of FIG. 6A, the e-signature workflow object includes only vetted signatories.

Figure 6B:
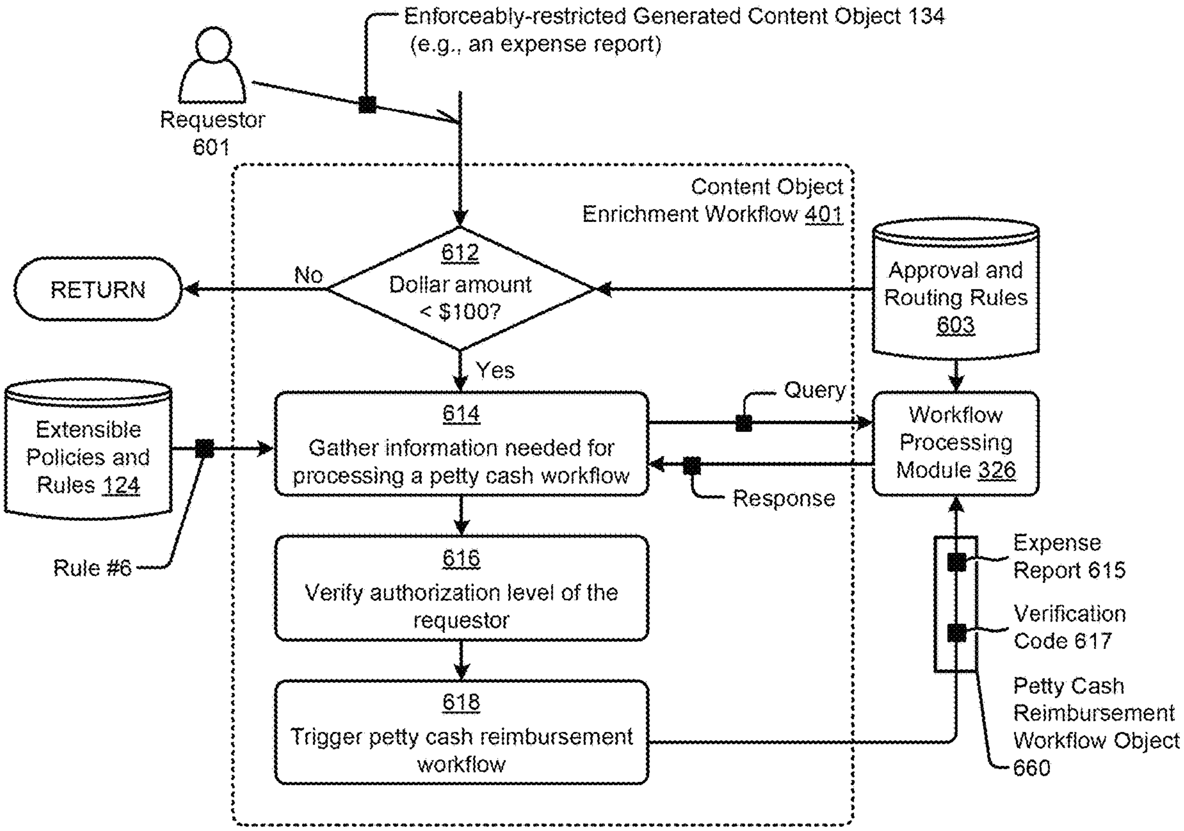
FIG. 6B depicts an example expense approval use case as used in systems that process generated content objects through a policy-aware workflow, according to an embodiment.

FIG. 6B depicts an example expense approval use case as used in systems that process generated content objects through a policy-aware workflow. As an option, one or more variations of expense approval use case 6B00 or any aspect thereof may be implemented in the context of the architecture and functionality of the embodiments described herein and/or in any environment.

The shown expense approval processing commences when a requestor 601 submits an expense report. In the context of this disclosure, the expense report is an instance of an auto-generated content object (e.g., the shown enforceably-restricted generated content object 134). The expense report is subjected to data enrichment (e.g., via information gathering dataflow 401). During the enrichment process, various characteristics (e.g., dollar amount) of the expense report are determined. In this case, it is determined (at decision 612) that the dollar amount is less than $100 and, in accordance with applicable approval and routing rules 603, it is further determined that the expense report should be processed in accordance with a petty cash workflow.

Additional information needed to process the expense report in accordance with a petty cash workflow can be gathered (step 614) from a response to a query made to an instance of workflow processing module 326. In the shown example, the workflow processing module 326 accesses approval and routing rules 603 to determine that the authorization level of the requestor needs to be verified before triggering a reimbursement. Further, in the shown example, the repository of extensible policies and rules 124 is accessed to determine which policies and/or rules apply. In this case rule #6 applies, so it is determined that no e-signature process is needed. Thus, in accordance with the gathered information, step 616 is carried out to verify the authorization level of the requestor. Assuming that the requestor is indeed authorized, step 618 serves to trigger a petty cash workflow.

As shown, the petty cash workflow is triggered by presentation of a petty cash reimbursement workflow object 660, which includes expense report 615 and verification code 617. In this specific use case, the verification code securely confirms that the requestor is both authenticated and authorized.

Figure 6C:
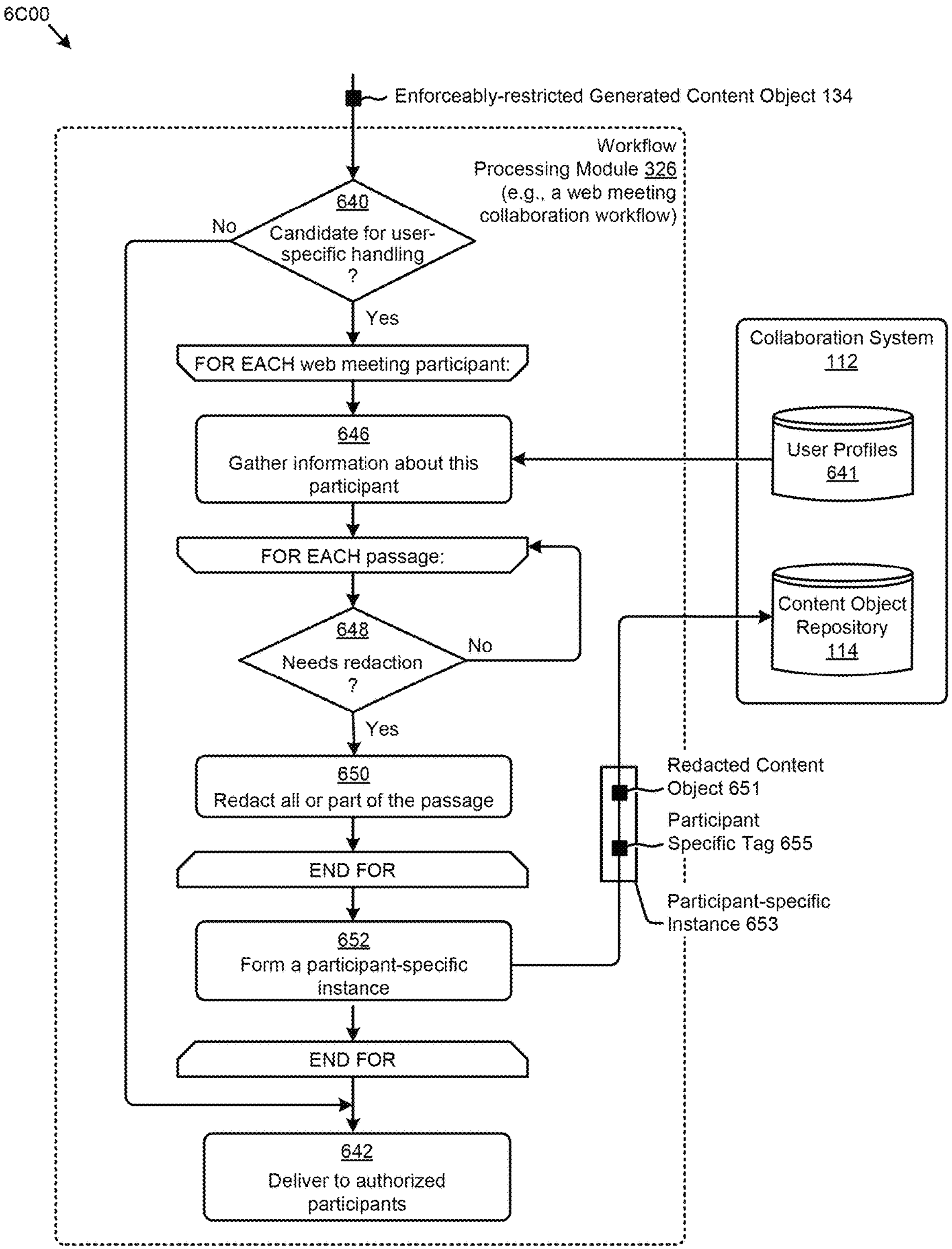
FIG. 6C depicts an example web meeting use case as used in systems that generate participant-specific content objects, according to an embodiment.

FIG. 6C depicts an example web meeting use case as used in systems that generate participant-specific content objects. As an option, one or more variations of web meeting use case 6C00 or any aspect thereof may be implemented in the context of the architecture and functionality of the embodiments described herein and/or in any environment.

The figure is being presented to illustrate how a particular auto-generated content object can be redacted based on characteristics of each individual web meeting participant. More particularly, the figure is being presented to illustrate how a particular portion of an auto-generated content object can be redacted based on each individual web meeting participant's characteristics. As examples, a redaction might obliterate all or portions of a passage, or a redaction might limit access to a particular portion of the auto-generated content object.

The shown flow includes a determination (test 640) as to whether or not a particular instance of an enforceably-restricted generated content object 134 needs to be processed on a per-participant basis. If so, then via the "Yes" branch of test 640, the flow enters into a FOR EACH loop that iterates over all meeting participants. Each iteration performs participant-specific redactions as would be needed to comport to the restrictions of the enforceably-restricted generated content object with respect to characteristics of the particular web meeting participant. Each iteration gathers information about the particular participant (step 646). In this example, such information about the particular participant can be obtained by accessing user profiles 641. In other embodiments, information about the particular participant can be obtained by intaking data retrieved from applications or interfaces of third party systems.

Upon completion of the data gathering at step 646, and in combination with the enforceably-restricted generated content object, there is sufficient information to be able to determine if and how a particular portion or passage of the enforceably-restricted generated content object is to be modified (e.g., redacted in whole or in part). Accordingly, upon completion of step 646, a FOR EACH loop is entered wherein a decision (e.g., test 648) is made to determine if the particular passage corresponding to the particular iteration is to be subjected to redaction. If not, then the "No" branch of the decision is taken and the flow returns to the iterator. On the other hand, if the particular passage corresponding the particular iteration is determined to be subject to redaction, then the "Yes" branch of test 648 is taken and all or part of the passage is redacted (step 650). In some cases, the redaction involves making the redacted passage obliterated or unintelligible, but otherwise leaving the passage intact (e.g., for placement and pagination). In some cases, redacting a passage involves completely deleting the passage such that a recipient would not be able to know that there had been a redaction.

When all passages have been considered and processed (e.g., redacted in whole, redacted in part, completely deleted, etc.), then step 652 serves to package a participant-specific instance 653 that includes that particular participant-specific instance of the subject content object (e.g., redacted content object 651) and a participant-specific tag 655.

When the redaction flow has been carried out for all web meeting participants, the various participant-specific instances of the subject content object can be delivered to the corresponding participants (step 642).

Figure 6D:
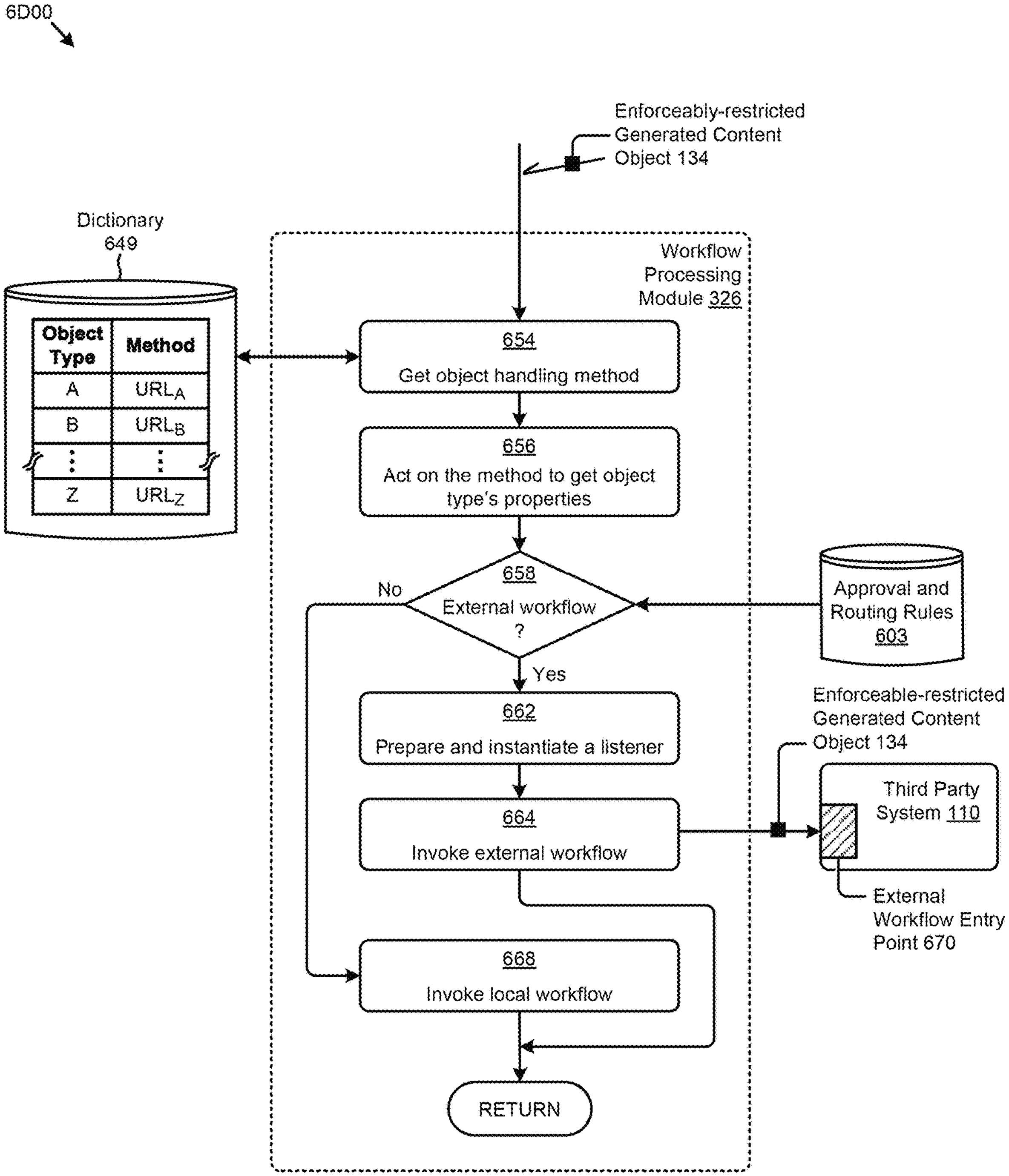
FIG. 6D depicts an example workflow processing use case, according to an embodiment.

FIG. 6D depicts an example workflow processing use case 6D00. As an option, one or more variations of the workflow processing use case and/or arrangements of the depicted computing modules or any aspect thereof may be implemented in the context of the architecture and functionality of the herein-described embodiments and/or in any alternative environment.

The figure is being presented to show how a workflow processing module 326 can access an external workflow (e.g., a workflow of a third party) when an enforceably-restricted generated content object 134 is determined to be of a type that is associated with a workflow of a third party system 110.

As shown, when an enforceably-restricted generated content object 134 is received into workflow processing module 326. Characteristics of the enforceably-restricted generated content object are checked (step 654) against an information source (e.g., dictionary 649) that relates a particular object type to a method of accessing the external workflow. Such an information source can be configured to use any method to relate a particular object type to a particular method of accessing an external workflow. In some cases, such an information source can be configured by a user or a third-party participant. In the example shown, a particular relationship between a particular object type and its method of accessing an external workflow is codified by a row. In the examples shown, each particular object type corresponds to a uniform resource locator (URL). As shown, object type 'A' is correlated with $URL_A$, object type 'B' is correlated with $URL_B$, and so on. Thus, given a particular method (in this case a URL) to access information that corresponds to the object type, step 656 serves to act on the method (e.g., call the URL) to get that object type's properties. Any particular object type can be associated with a method using any known technique. Moreover, any method itself can be codified using any known technique.

Many different properties can be returned in response to acting on the particular method. Strictly as pertains to this example, and in response to acting on the particular method, the workflow processing module can be informed about (1) the fact that an external workflow is being designated (or not) and (2) specifics pertaining to the external workflow entry point 670 of a third party system 110.

Once the foregoing properties have been accessed, a decision is taken to determine whether or not an external workflow is being designated. In some cases, such a decision (e.g., decision 658) can be informed by any manner of approval and routing rules 603. If it is determined that an external workflow is indeed being designated, then the "Yes" branch of decision 658 is taken, and at step 662, a listener is prepared and instantiated. The semantics of the foregoing approval and routing rules may inform details of how to prepare and instantiate a listener. The listener is invoked before invoking the external workflow (step 664) so as to facilitate handling of asynchronous operations between the workflow processing module 326 and the external workflow.

If it is determined that a local workflow (e.g., not an external workflow) is being designated, then the "No" branch of decision 658 is taken and the internal workflow is invoked (step 668). The local workflow can proceed based on operation of workflow processing module 326.

The logic of workflow processing module 326 supports many use cases. One particular use case is shown and described as pertains to FIG. 7A and FIG. 7B as follows. More particularly, the depiction of FIG. 7A and FIG. 7B illustrates how the herein-disclosed technologies can be combined to reduce or eliminate reliance on a user to operate or otherwise interact with the herein-disclosed technologies.

Figure 7A:
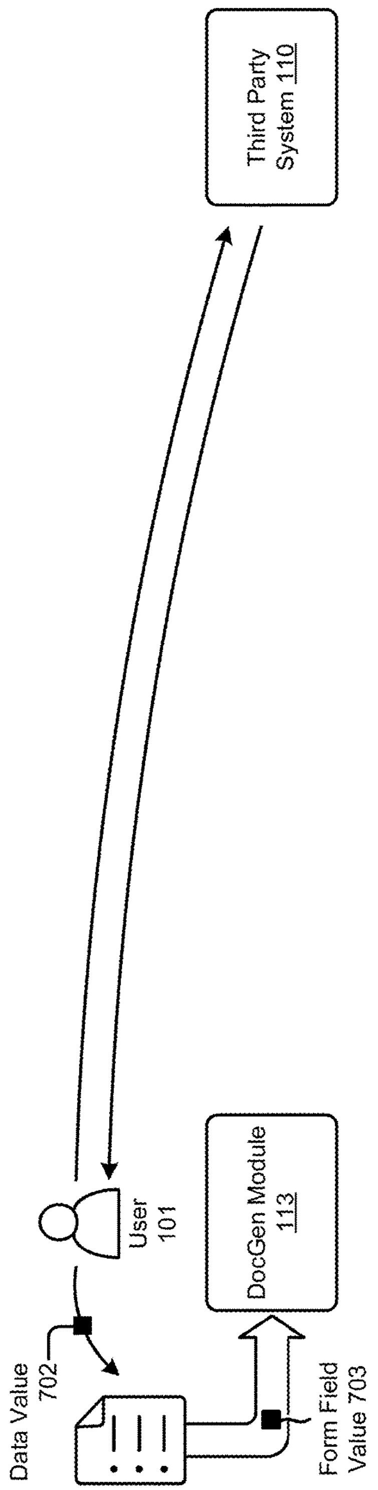
FIG. 7A and FIG. 7B depict system components as arrangements of computing modules that are interconnected so as to implement certain of the herein-disclosed embodiments.
Figure 7B:
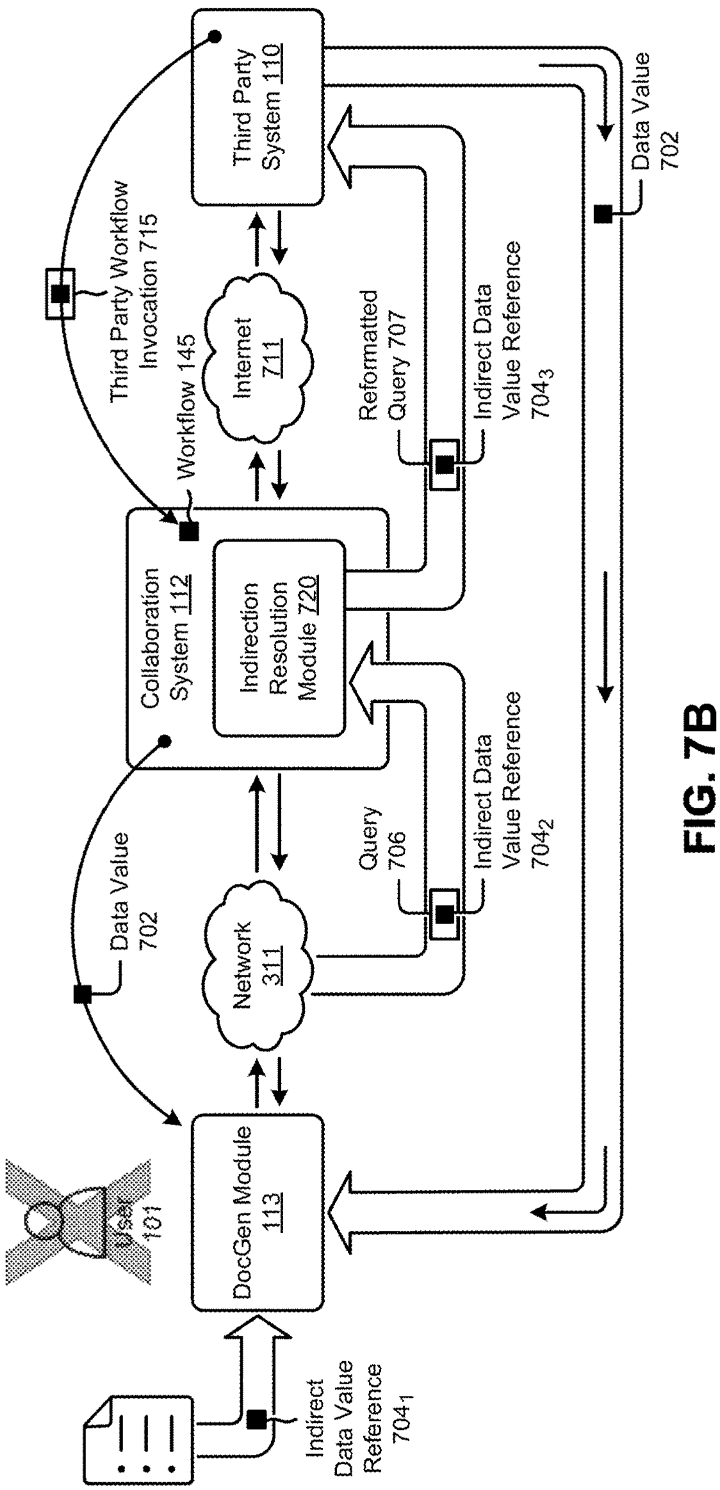

FIG. 7A and FIG. 7B depict system components as arrangements of computing modules that are interconnected so as to implement certain of the herein-disclosed embodiments. As an option, one or more variations of the system components and/or arrangements of computing modules or any aspect thereof may be implemented in the context of the architecture and functionality of the embodiments described herein and/or in any environment.

The two depictions are presented together to illustrate advances over prior techniques. Specifically, the advancements contemplated by the arrangements of computing modules of FIG. 7B eliminate the need for a user to be involved in the docgen process. To explain, consider the regime of FIG. 7A where user 101 interacts with a third party system. In this regime, through use of any known technique (e.g., via user interaction with an application user interface), user 101 accesses the shown third party system 110. The user retrieves information from the third party system, then optionally reformats or otherwise manipulates the retrieved information before providing a data value 702 to be used as a form field value 703 that is in turn provided to a document generation system (e.g., docgen module 113).

Now, consider the situation where there are many form field values to be retrieved, and/or where there are many data values, and/or where there are many documents to be generated by the docgen module—so many in fact that it becomes impracticable for a human user to process. In such a situation there needs to be some means by which the docgen module can operate in a manner that eliminates the need for human interaction. Such a scenario is shown and described as pertains to FIG. 7B.

Specifically, and as shown, a document generation system is configured so as to recognize an indirect data value reference 704$_1$, which indirect data value reference is automatically reformatted into an initial query (e.g., query 706) that includes the indirect data value reference (indirect data value reference 704$_2$). The query 706 is then presented to one or more collaboration system modules (e.g., the shown indirection resolution module 720). The collaboration system in turn determines what access mechanism to use. In the example shown, collaboration system 112 determines that the proper access mechanism to use in this case involves a reformatted query 707 that includes a copy of indirect data value reference (indirect data value reference 704$_3$). Reformatted query 707 is delivered to or otherwise made available to the determined third party system 110. Using any known methods (e.g., using the Internet 711 and/or any other network 311, or by other means as shown), a data value 702 corresponding to the indirect data value reference is provided to the document generation system (e.g., docgen module 113).

In one particular embodiment, using any known methods, a third party system might raise a third party workflow invocation 715 corresponding to a request made to collaboration system 112 to invoke a workflow. The third party workflow invocation 715 may contain sufficient information for the invoked workflow to resolve the indirect data value reference to a data value 702, which data value is provided to the document generation system (e.g., docgen module 113).

The document generation system in turn uses the data value (e.g., in a template field) when assembling an generated content object. This procedure, whereby the third party system invokes a workflow of the collaboration system, can be used in any setting or for any use case. In some cases, invoked workflow causes further document generation activity, which may include notification to the third party system that such further document generation activity has completed. Strictly as one example, a third party system that handles financial information might invoke a workflow of the collaboration system at an entry point that corresponds to forming (e.g., via docgen) an invoice. When the auto-generated invoice has been stored, the collaboration system notifies the third party system that the invoice has been generated and stored in the content management system.

As is known in the art, any portion of an intended auto-generated content object can be represented as a template parameter (e.g., field variable or template variable). Moreover, any template parameter can be represented in a GUI form or in a template form using any syntax. In some cases the syntax itself carries sufficient semantics that a document generation system can determine how to resolve a template parameter to a particular value based merely on the syntax. For example, a syntax for a field variable or template variable can be defined such that all or portions of a field variable or template variable itself can inform aspects such as where to get the value (e.g., from a database, or from a GUI, or from a third party system, etc.), what formatting is to be applied to the retrieved value, etc. One example of a template that includes syntactically-rich form or template variables that can be used in certain document generation scenarios is shown and described as pertains to FIG. 8A.

Figure 8A:
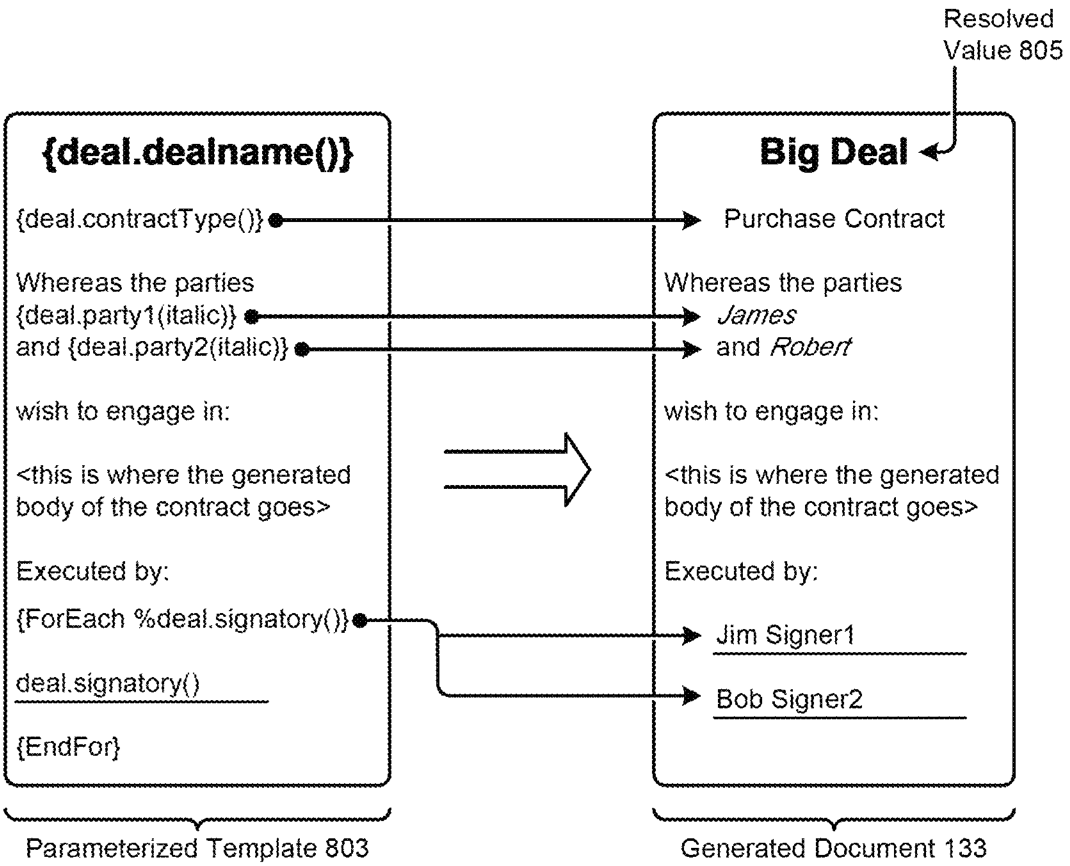
FIG. 8A depicts a document generation scenario where values for template field expressions are provided by a third party, according to an embodiment.

FIG. 8A depicts a document generation scenario where values for template field expressions are provided by a third party. As an option, one or more variations of the document generation scenario or any aspect thereof may be implemented in the context of the architecture and functionality of the embodiments described herein and/or in any environment.

As indicated above, a syntax for a template parameter (e.g., a field variable or template variable) can be defined such that all or portions of the template parameter itself can inform aspects of how to resolve the template parameter to a specific value that is in turn used in the process of document generation. Strictly to illustrate one example, FIG. 8A depicts a parameterized template 803 that becomes a generated document 133. In this particular example, the syntax of the parameters involves delimiters (e.g., "{", "}", "(", ")" and ".") which delimiters serve to separate the parameters from what is known as plain text as well as to separate alphanumeric intra-parameter identifiers from one another (e.g., "deal" from "dealname").

By observing delimiters, a parser can recognize the intra-parameter identifier "deal" as being distinct from the intra-parameter identifier "dealname". A dictionary or other lookup facility can be used to relate a particular intra-parameter identifier and its location within a subject parameter. Accordingly, based on the information that derives from the lookup, the lookup facility can invoke certain specific predefined actions that ultimately result in retrieval of a value for the subject parameter. In the instant example, the intra-parameter identifier "deal" as is present in the template parameter "{deal.dealname( )}" resolves to a web address of an application programming interface (API) at a third party system. The parser invokes the API of the third party system. In response, the API of the third party system returns a value or multiple values corresponding to the subject parameter.

The value or multiple values are then inserted into the generated document 133 (e.g., resolved value 805) and in whatever specified presentation format (e.g., centered presentation of the name "Big Deal"). The aforementioned predefined actions that ultimately result in retrieval of a value for the subject parameter might need to involve multiple third party systems. In some cases, access to the multiple third party systems are carried out in a chained fashion. For example, a first access to an endpoint of a first third party system (e.g., "Workday") might be used to resolve to an employee number, and the employee number might then be chained into a query and to a second third party system (e.g., "Salesforce") to resolve to a list of deals in which the employee is a contributor or participant. As another example, a first access to an endpoint of a first third party system (e.g., "Workday") might be used to resolve to the employee's "Venmo" handle, and the employee's online banking handle might then be chained into a query to a second third party system (e.g., "Venmo") to resolve to a method of payment. This process of traversing any number of hops to resolve to a value or values of a template parameter is called "hydration". In some cases a hydrated value is itself or contains personally identifiable and/or other sensitive information and, in such cases, the value or values can be handled using a secure transmission protocol (e.g., the "https:" protocol).

In some embodiments involving rich text and corresponding rich syntactical constructions, the format of the template parameter itself defines the output format. For example, if the template parameter is given in the parameterized template in bold typeface at 14 point size, the value is presented in the output document in bold typeface at 14 point size. Additionally or alternatively, the expression within the parenthesis can be used to inform aspects of the value or multiple values of the template parameter. For example, the expression within the parenthesis (e.g., "(italic)" can specify how the value or multiple values of the template parameter is to be formatted. In some cases, the expression within the parenthesis (e.g., "(italic)" or "(Base10)" or "(phone_number_format)" or "(toUpper)" or "(toLower)") can specify how the value or multiple values are to be presented in the output.

As depicted in this particular purchase contract example, an intra-parameter identifier can comprise an alphanumeric combination. For example, the alphanumeric string "party1" in the context of the template parameter "{deal.party1( )}" refers to the first-listed party to the contract, and the alphanumeric string "party2" in the context of the template parameter "{deal.party2( )}" refers to the second-listed party to the contract. The actual values received from the third party system represent the actual names of the parties. In this example, "James" and "Robert" are the two parties who are entering into the agreement.

In some cases, there is a one-to-one mapping between a template parameter and its value. In other cases there is a one-to-many mapping between a template parameter and many values. In still other cases a template parameter can have an attribute that quantifies the number of however many values. This semantic can be used in a ForEach loop, where each iteration through a ForEach loop returns a corresponding value. One example is given in the shown parameterized template 803. Specifically, each iteration through the "{ForEach % deal.signatory( )} loop returns the name of a next signatory. Further, each iteration through the "{ForEach % deal.signatory( )} loop outputs a signature line. This is shown in the generated document by the two signature lines, one for "Jim Signer 1" and one for "Bob Signer 2".

Various additional constructs can be provided. In some cases a template parameter includes construct keywords that inform further parsing. Strictly as examples, Table 1 presents construct keywords.

TABLE 1

Construct keywords

| Line # | Keyword |
|---|---|
| 1. | Substitution |
| 2. | If |
| 3. | ElseIf |
| 4. | Else |
| 5. | endIf |
| 6. | for |
| 7. | endfor |
| 8. | arithmetic |

Various additional constructs can be provided. In some cases a template parameter includes evaluated expressions that inform how to resolve all or portions of a template parameter. Table 2 presents sample code using evaluated expressions.

TABLE 2

Evaluated expressions

| Line # | Sample Code |
|---|---|
| 1. | expr(item.price > item.discount) |
| 2. | expr(employee.status == "employed" or employee.active == "active") |

Any template parameters can be combined with other template parameters and plain text to create a parameterized document. Table 3 presents a parameterized template using combinations of template parameters and plain text to create a generated document.

TABLE 3

A Parameterized Template

| Line # | Code |
|---|---|
| 1. | Hello {{employee.firstName}} {{employee.lastName}}, |
| 2. | You will be paid a total salary of {{ expr(employee.salary + employee.bonus) }}. |
| 3. | {{if state == 'CA' }} |
| 4. | We will withhold {{ stateTax }} % state tax from your paycheck. |
| 5. | {{ else-if state == 'TX' }} |
| 6. | We will not withhold state tax from your paycheck. |
| 7. | {{ else }} |
| 8. | We do not have an office in your state. |
| 9. | |
| 10. | {{firstname :: uppercase}} |
| 11. | {{firstname :: lowercase}} |
| 12. | {{date :: format(dd-mm-yyyy) }} |
| 13. | {{employee.ssn :: format(xx-xx-xxxx) }} |
| 14. | {{order.total :: format(US-Number) }} |
| 15. | {{order.total :: format(EU-Number) }} |

As noted above, the conditional constructs ("If" and "Else") can be used to control output to the generated document (e.g., as coded into lines 5 through line 8). The conditional constructs can be combined with loops. More particularly, the concept of a loop and corresponding looping control structures can be extended to include further conditional looping constructs such as conditional and/or parameterized "FOR" loops. In fact, parameterized looping constructs can be of any complexity, possibly involving mixtures of parameters that resolve both from third party systems as well as from intra-template local data structures as well as from a collaboration system. One example looping construct is shown and described as pertains to FIG. 8B.

Figure 8B:
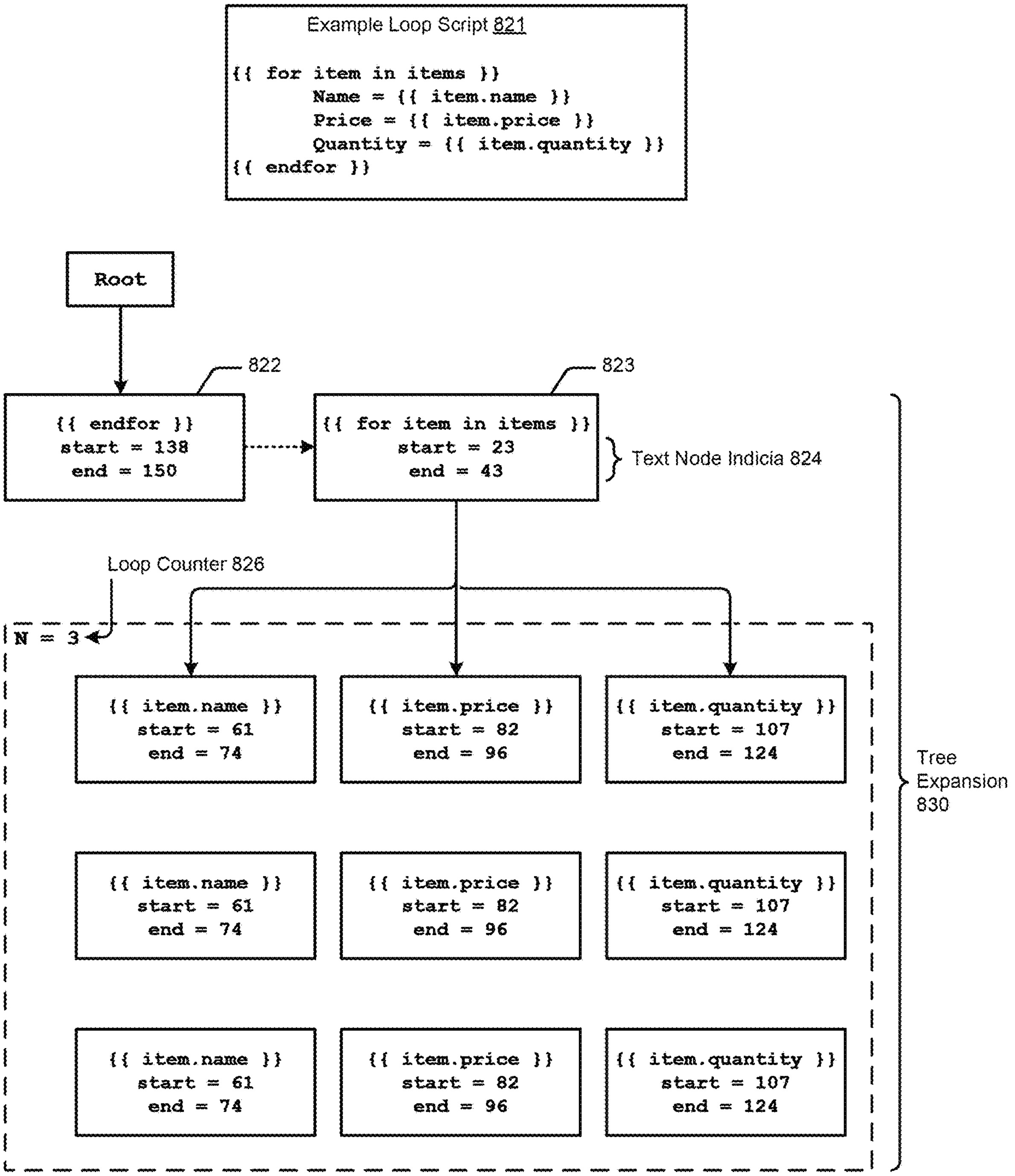
FIG. 8B depicts a document generation scenario where template field looping constructs are expanded based on parameterized loop expressions, according to an embodiment.

FIG. 8B depicts a document generation scenario where template field looping constructs are expanded based on a parameterized loop expression. As an option, one or more variations of the depiction of or any aspect thereof may be implemented in the context of the architecture and functionality of the embodiments described herein and/or in any environment.

FIG. 8B includes an example loop script 821. For illustration, this loop script includes three parameters, each of which is to be expanded as many times as the number of items in a list. In this case, the number of items in the list is designated as "item" and the list is designated as "items". In FIG. 8B, the expansion of the loop script is shown as tree expansion 830. The tree expansion contains all elements needed to realize the intent of the script. Specifically, the tree expansion has a node denoting the end of the loop (node 822), a node denoting the beginning of the loop (node 823), a loop counter 826, and a multi-branch realization of the loop expansion in correspondence to the loop counter 826. Each node may have text node indicia 824 that refers to a byte range of its corresponding loop script.

As indicated above, parameterized looping constructs can be of any complexity, possibly involving mixtures of parameters that resolve from third party systems and/or from intra-template local data structures, and/or from a collaboration system's content objects (e.g., spreadsheets, lists, etc.), and/or via a plug-in or from a database query, and/or from user input. In this example, the parameters (e.g., "item.name", "item.price", and "item.quantity") refer to intra-template local data structures, however they could be parameters that resolve from a third party system and/or from a collaboration system.

Documents generated using the foregoing processes to access third party systems can be subjected to all or portions of the lifecycle analysis as described supra.

Additional Embodiments of The Disclosure

Instruction Code Examples

Figure 9A:
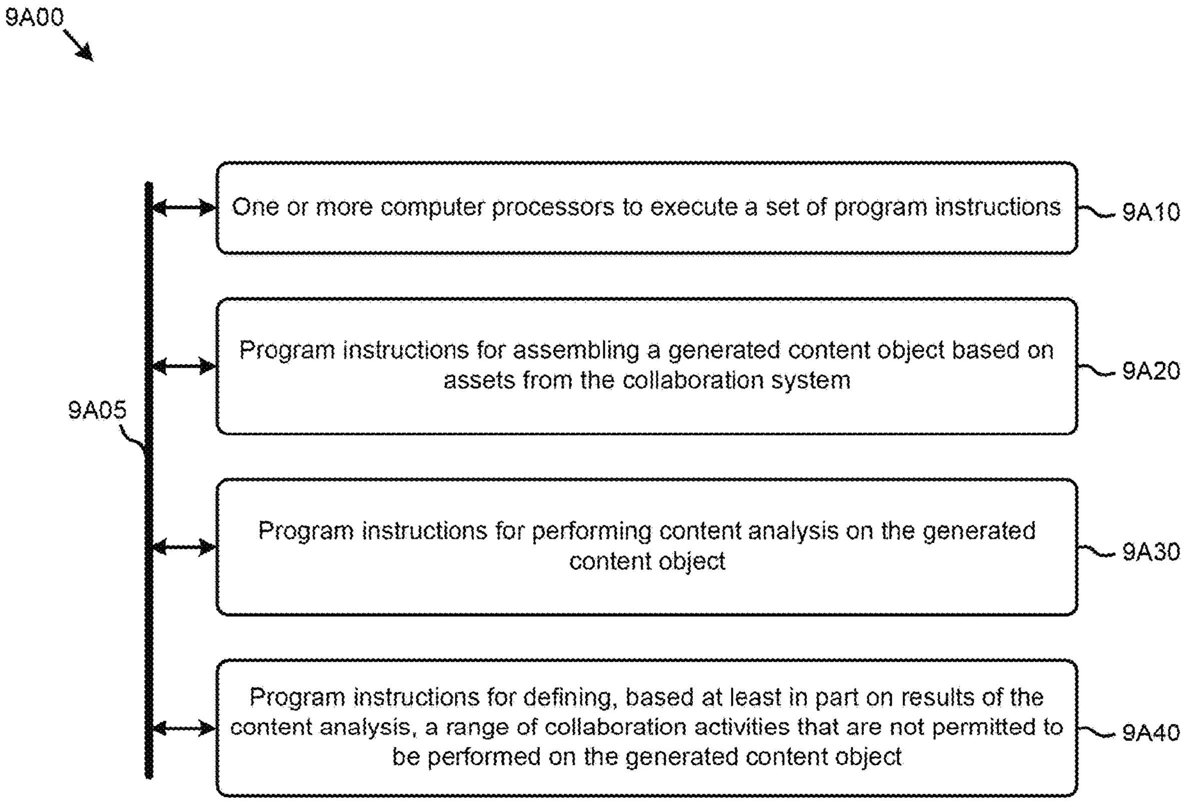
FIG. 9A and FIG. 9B depict system components as arrangements of computing modules that are interconnected so as to implement certain of the herein-disclosed embodiments.

FIG. 9A depicts system 9A00 as an arrangement of computing modules that are interconnected so as to operate cooperatively to implement certain of the herein-disclosed embodiments. This and other embodiments present particular arrangements of elements that, individually or as combined, serve to form improved technological processes that address defining and enforcing permissions and policies over auto-generated content objects. The partitioning of system 9A00 is merely illustrative and other partitions are possible.

Variations of the foregoing may include more or fewer of the shown modules. Certain variations may perform more or fewer (or different) steps and/or certain variations may use data elements in more, or in fewer, or in different operations. As an option, system 9A00 may be implemented in the context of the architecture and functionality of the embodiments described herein. Of course, however, system 9A00 or any operation therein may be carried out in any desired environment.

The system 9A00 comprises at least one processor and at least one memory, the memory serving to store program instructions corresponding to the operations of the system. As shown, an operation can be implemented in whole or in part using program instructions accessible by a module. The modules are connected to a communication path 9A05, and any operation can communicate with any other operations over communication path 9A05. The modules of the system can, individually or in combination, perform method operations within system 9A00. Any operations performed within system 9A00 may be performed in any order unless as may be specified in the claims.

The shown embodiment implements a portion of a computer system, presented as system 9A00, comprising one or more computer processors to execute a set of program code instructions (module 9A10) and modules for accessing memory to hold program code instructions for: assembling a generated content object based on assets from the collaboration system (module 9A20); performing content analysis on the generated content object (module 9A30); and defining, based at least in part on results of the content analysis, a range of collaboration activities that are not permitted to be performed on the generated content object (module 9A40).

Still further, some embodiments include variations in the operations performed, and some embodiments include variations of aspects of the data elements used in the operations.

Figure 9B:
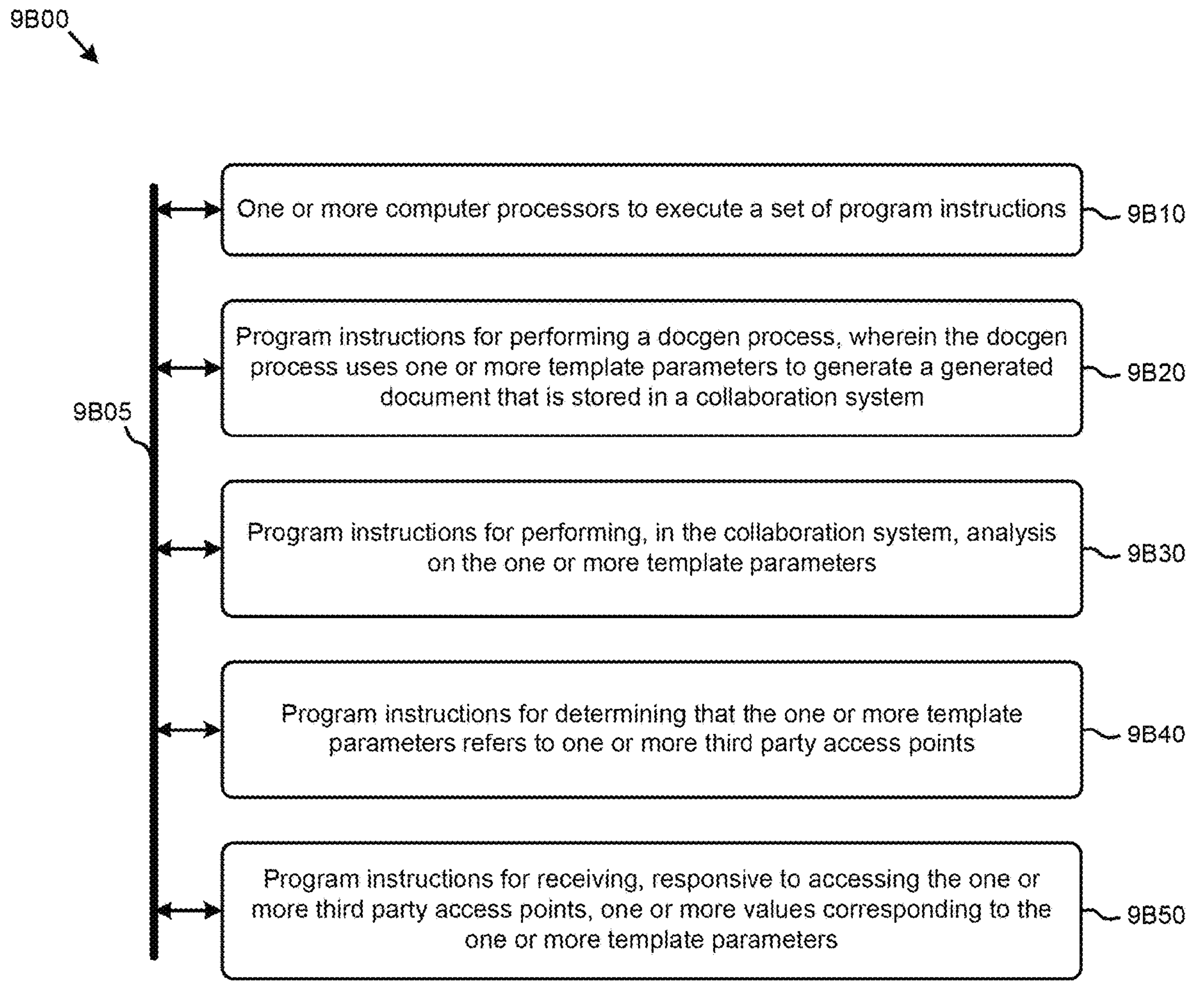

FIG. 9B depicts system 9B00 as an arrangement of computing modules that are interconnected so as to operate cooperatively to implement certain of the herein-disclosed embodiments. This and other embodiments present particular arrangements of elements that, individually or as combined, serve to form improved technological processes that address defining and enforcing permissions and policies over auto-generated content objects. The partitioning of system 9B00 is merely illustrative and other partitions are possible.

Variations of the foregoing may include more or fewer of the shown modules. Certain variations may perform more or fewer (or different) steps and/or certain variations may use data elements in more, or in fewer, or in different operations. As an option, system 9B00 may be implemented in the context of the architecture and functionality of the embodiments described herein. Of course, however, system 9B00 or any operation therein may be carried out in any desired environment.

The system 9B00 comprises at least one processor and at least one memory, the memory serving to store program instructions corresponding to the operations of the system. As shown, an operation can be implemented in whole or in part using program instructions accessible by a module. The modules are connected to a communication path 9B05, and any operation can communicate with any other operations over communication path 9B05. The modules of the system can, individually or in combination, perform method operations within system 9B00. Any operations performed within system 9B00 may be performed in any order unless as may be specified in the claims.

The shown embodiment implements a portion of a computer system, presented as system 9B00, comprising one or more computer processors to execute a set of program code instructions (module 9B10) and modules for accessing memory to hold program code instructions to for: performing a docgen process, wherein the docgen process uses one or more template parameters to generate a generated document that is stored in a collaboration system (module 9B20); performing, in the collaboration system, analysis on the one or more template parameters (module 9B30); determining that the one or more template parameters refers to one or more third party access points (module 9B40); and receiving, responsive to accessing the one or more third party access points, one or more data values corresponding to the one or more template parameters (module 9B50).

Still further, some embodiments include variations in the operations performed, and some embodiments include variations of aspects of the data elements used in the operations.

System Architecture Overview

Additional System Architecture Examples

Figure 10A:
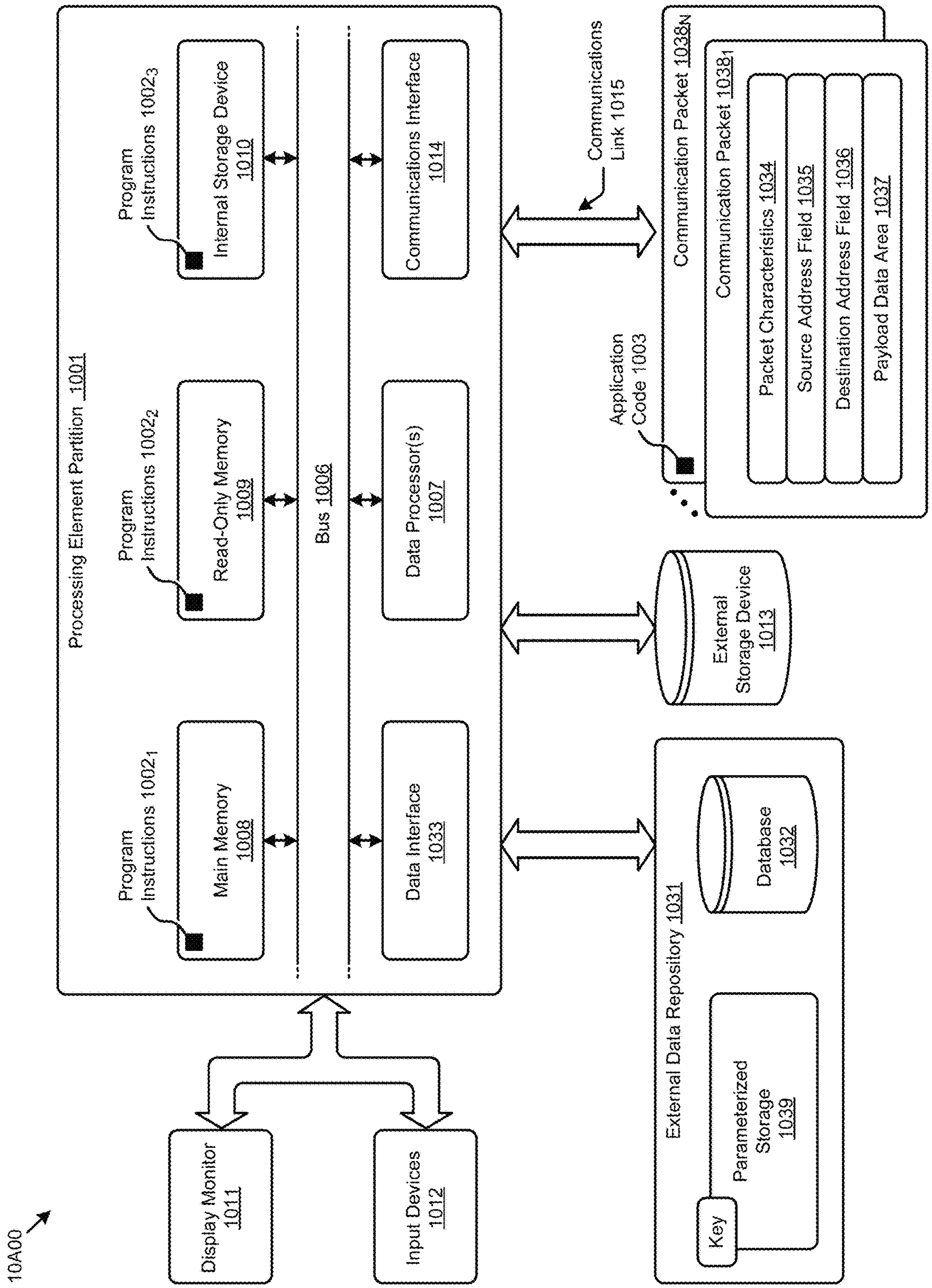
FIG. 10A and FIG. 10B present block diagrams of computer system architectures having components suitable for implementing embodiments of the present disclosure and/or for use in the herein-described environments.

FIG. 10A depicts a block diagram of an instance of computer system 10A00 suitable for implementing embodiments of the present disclosure. Computer system 10A00 includes a bus 1006 or other communication mechanism for communicating information. The bus interconnects subsystems and devices such as a central processing unit (CPU), or a multi-core CPU (e.g., data processor 1007), a system memory (e.g., main memory 1008, or an area of random access memory (RAM)), a non-volatile storage device or non-volatile storage area (e.g., read-only memory 1009), an internal storage device 1010 or external storage device 1013 (e.g., magnetic or optical), a data interface 1033, a communications interface 1014 (e.g., PHY, MAC, Ethernet interface, modem, etc.). The aforementioned components are shown within processing element partition 1001, however other partitions are possible. Computer system 10A00 further comprises a display 1011 (e.g., CRT or LCD), various input devices 1012 (e.g., keyboard, cursor control), and an external data repository 1031.

According to an embodiment of the disclosure, computer system 10A00 performs specific operations by data processor 1007 executing one or more sequences of one or more program instructions contained in a memory. Such instructions (e.g., program instructions $\mathbf{1002}_1$, program instructions $\mathbf{1002}_2$, program instructions $\mathbf{1002}_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 10A00 performs specific networking operations using one or more instances of communications interface 1014. Instances of communications interface 1014 may comprise one or more networking ports that are configurable (e.g., pertaining to speed, protocol, physical layer characteristics, media access characteristics, etc.) and any particular instance of communications interface 1014 or port thereto can be configured differently from any other particular instance. Portions of a communication protocol can be carried out in whole or in part by any instance of communications interface 1014, and data (e.g., packets, data structures, bit fields, etc.) can be positioned in storage locations within communications interface 1014, or within system memory, and such data can be accessed (e.g., using random access addressing, or using direct memory access DMA, etc.) by devices such as data processor 1007.

Communications link 1015 can be configured to transmit (e.g., send, receive, signal, etc.) any types of communications packets (e.g., communication packet $\mathbf{1038}_1$, communication packet $\mathbf{1038}_N$) comprising any organization of data items. The data items can comprise a payload data area 1037, a destination address 1036 (e.g., a destination IP address), a source address 1035 (e.g., a source IP address), and can include various encodings or formatting of bit fields to populate packet characteristics 1034. In some cases, the packet characteristics include a version identifier, a packet or payload length, a traffic class, a flow label, etc. In some cases, payload data area 1037 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 1007 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1031, which in turn can be formatted into any one or more storage areas, and which can comprise parameterized storage 1039 accessible by a key (e.g., filename, table name, block address, offset address, etc.).

Execution of the sequences of instructions to practice certain embodiments of the disclosure are performed by a single instance of a computer system 10A00. According to certain embodiments of the disclosure, two or more instances of computer system 10A00 coupled by a communications link 1015 (e.g., LAN, public switched telephone network, or wireless network) may perform the sequence of instructions required to practice embodiments of the disclosure using two or more instances of components of computer system 10A00.

Computer system 10A00 may transmit and receive messages such as data and/or instructions organized into a data structure (e.g., communications packets). The data structure can include program instructions (e.g., application code 1003), communicated through communications link 1015 and communications interface 1014. Received program instructions may be executed by data processor 1007 as it is received and/or stored in the shown storage device or in or upon any other non-volatile storage for later execution. Computer system 10A00 may communicate through a data interface 1033 to a database 1032 on an external data repository 1031. Data items in a database can be accessed using a primary key (e.g., a relational database primary key).

Processing element partition 1001 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 1007. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to associating allow/deny permissions to collaboration activities that apply to auto-generated content objects. A module may include one or more state machines and/or combinational logic used to implement or facilitate the operational and/or performance characteristics pertaining to associating allow/deny permissions to collaboration activities that apply to auto-generated content objects.

Various implementations of database 1032 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of associating allow/deny permissions to collaboration activities that apply to auto-generated content objects). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to associating allow/deny permissions to collaboration activities that apply to auto-generated content objects, and/or for improving the way data is manipulated when performing computerized operations pertaining to associating sets of item-specific security and governance policies to auto-generated content objects.

Figure 10B:
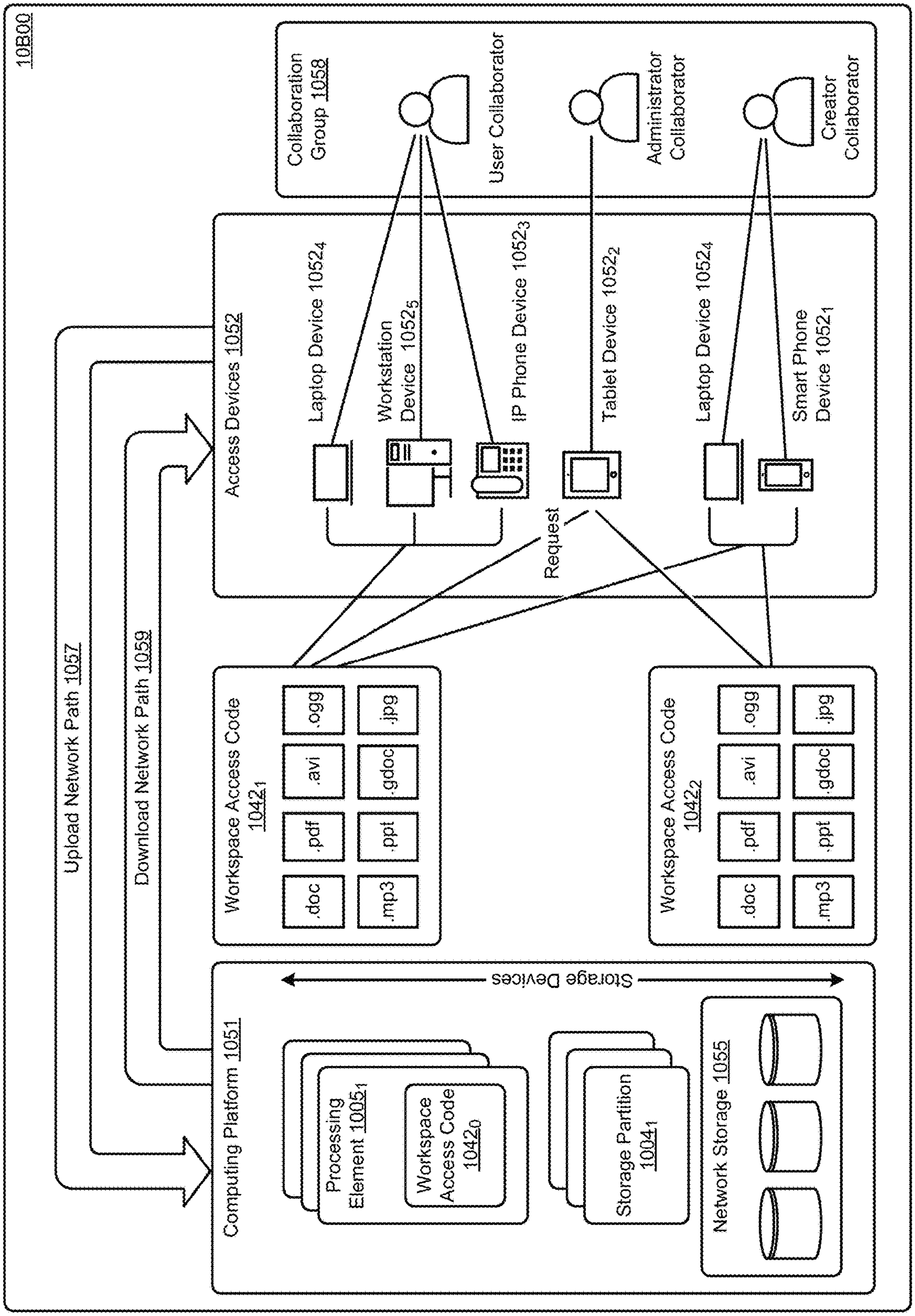

FIG. 10B depicts a block diagram of an instance of a cloud-based environment 10B00. Such a cloud-based environment supports access to workspaces through the execution of workspace access code (e.g., workspace access code $\mathbf{1042}_0$, workspace access code $\mathbf{1042}_1$, and workspace access code $\mathbf{1042}_2$). Workspace access code can be executed on any of access devices 1052 (e.g., laptop device $\mathbf{1052}_4$, workstation device $\mathbf{1052}_5$, IP phone device $\mathbf{1052}_3$, tablet device $\mathbf{1052}_2$, smart phone device $\mathbf{1052}_1$, etc.), and can be configured to access any type of object. Strictly as examples, such objects can be folders or directories or can be files of any filetype. The files or folders or directories can be organized into any hierarchy. Any type of object can comprise or be associated with access permissions. The access permissions in turn may correspond to different actions to be taken over the object. Strictly as one example, a first permission (e.g., PREVIEW_ONLY) may be associated with a first action (e.g., preview), while a second permission (e.g., READ) may be associated with a second action (e.g., download), etc. Furthermore, permissions may be associated to or with any particular user or any particular group of users.

A group of users can form a collaboration group 1058, and a collaboration group can be composed of any types or roles of users or participants. For example, and as shown, a collaboration group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 1051, including in a middleware setting. As shown, a portion of the workspace access code resides in and can be executed on one or more processing elements (e.g., processing element $\mathbf{1005}_1$). The workspace access code can interface with storage devices such as networked storage 1055. Storage of workspaces and/or any constituent files or objects, and/or any other code or scripts or data can be stored in any one or more storage partitions (e.g., storage partition $\mathbf{1004}_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 1057). A stored workspace can be delivered to a particular user and/or shared with other particular users via a download (e.g., a download from a processing element to an access device over a download network path 1059).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for automatically generating a content object in a collaboration system, the method comprising:

performing a document generation process, wherein the document generation process uses one or more template parameters to generate a generated document that is stored in the collaboration system;

performing, in the collaboration system, analysis on the one or more template parameters in a template;

determining that the one or more template parameters in the template reference one or more third party access points based on the analysis on the one or more template parameters in the template;

defining, in response to the determination that the one or more template parameters in the template reference the one or more third party access points, collaboration activities permitted by the collaboration system at least by:

accessing the one or more third party access points to retrieve one or more data values corresponding to the one or more template parameters in the template; and configuring collaboration activities permitted by the collaboration system for the generated document based on at least the one or more data values received in response to accessing the one or more third party access points referenced by the template and corresponding to the one or more template parameters.

2. The method of claim 1, wherein a first third party access point of the one or more third party access points corresponds to a first third party system of a first entity and a second third party access point of the one or more third party access points corresponds to a second third party system of a second entity.

3. The method of claim 1, wherein the one or more template parameters in the template reference the one or more third party access points using one or more indirect references, and an indirect reference is automatically reformatted by the collaboration system into a query that is delivered to a third party system and processed by the third party system to generate a response comprising at least the one or more data values.

4. The method of claim 2, wherein at least one of the first third party system or the second third party system invokes a workflow of the collaboration system.

5. The method of claim 1, wherein accessing the one or more third party access points causes a third party workflow invocation to resolve the one or more data values and return the one or more data values in response to the access.

6. The method of claim 1, wherein the one or more data values are received from a third party application referenced by a universal resource locator (URL) or an application programming interface (API) at a third party system of one or more third parties.

7. The method of claim 1, wherein the collaboration activities permitted by the collaboration system for the generated document are defined based on at least analysis of the generated document by the collaboration system.

8. The method of claim 1, further comprising redacting a passage from the generated document.

9. The method of claim 1, wherein at least a portion of the one or more template parameters refers to at least one of a local data structure, one or more content objects of the collaboration system, a spreadsheet, a plug-in, a database query, or user input.

10. A non-transitory computer readable medium having stored thereon a sequence of instructions which, when stored in memory and executed by a processor, causes a set of acts for automatically generating a content object in a collaboration system, the set of acts comprising:

performing a document generation process, wherein the document generation process uses one or more template parameters to generate a generated document that is stored in the collaboration system;

performing, in the collaboration system, analysis on the one or more template parameters in the template;

determining that the one or more template parameters in the template reference one or more third party access points based on the analysis on the one or more template parameters in the template;

defining, in response to the determination that the one or more template parameters in the template reference the one or more third party access points, collaboration activities permitted by the collaboration system at least by:

accessing the one or more third party access points to retrieve one or more data values corresponding to the one or more template parameters in the template; and configuring collaboration activities permitted by the collaboration system for the generated document based on at least the one or more data values received in response to accessing the one or more third party access points referenced by the template and corresponding to the one or more template parameters.

11. The non-transitory computer readable medium of claim 10, wherein a first third party access point of the one or more third party access points corresponds to a first third party system of a first entity and a second third party access point of the one or more third party access points corresponds to a second third party system of a second entity.

12. The non-transitory computer readable medium of claim 10, wherein the one or more template parameters in the template reference the one or more third party access points using one or more indirect references, and an indirect reference is automatically reformatted by the collaboration system into a query that is delivered to a third party system and processed by the third party system to generate a response comprising at least the one or more data values.

13. The non-transitory computer readable medium of claim 11, wherein at least one of the first third party system or the second third party system invokes a workflow of the collaboration system.

14. The non-transitory computer readable medium of claim 10, wherein accessing the one or more third party access points causes a third party workflow invocation to resolve the one or more data values and return the one or more data values in response to the access.

15. The non-transitory computer readable medium of claim 10, wherein the one or more data values are received from a third party application referenced by a universal resource locator (URL) or an application programming interface (API) at a third party system of one or more third parties.

16. The non-transitory computer readable medium of claim 10, wherein the collaboration activities permitted by the collaboration system for the generated document are defined based on at least analysis of the generated document by the collaboration system.

17. The non-transitory computer readable medium of claim 10, wherein the set of acts further comprises redacting a passage from the generated document.

18. The non-transitory computer readable medium of claim 10, wherein at least a portion of the one or more template parameters refers to at least one of a local data structure, one or more content objects of the collaboration system, a spreadsheet, a plug-in, a database query, or user input.

19. A system for automatically generating a content object in a collaboration system, the system comprising:

a storage medium having stored thereon a sequence of instructions; and a processor that executes the sequence of instructions to cause a set of acts comprising, performing a document generation process, wherein the document generation process uses one or more template parameters to generate a generated document that is stored in the collaboration system;

performing, in the collaboration system, analysis on the one or more template parameters in the template;

determining that the one or more template parameters in the template reference one or more third party access points based on the analysis on the one or more template parameters in the template;

defining, in response to the determination that the one or more template parameters in the template reference the one or more third party access points, collaboration activities permitted by the collaboration system at least by:

accessing the one or more third party access points to retrieve one or more data values corresponding to the one or more template parameters in the template; and configuring collaboration activities permitted by the collaboration system for the generated document based on at least the one or more data values received in response to accessing the one or more third party access points referenced by the template and corresponding to the one or more template parameters.

20. The system of claim 19, wherein a first third party access point of the one or more third party access points corresponds to a first third party system of a first entity and a second third party access point of the one or more third party access points corresponds to a second third party system of a second entity.

* * * * *